(12) United States Patent
Mellier et al.

(10) Patent No.: US 11,788,837 B2
(45) Date of Patent: *Oct. 17, 2023

(54) METHODS FOR OBTAINING A GEOSPATIAL POSITION USING A POSITIONING DEVICE

(71) Applicant: Trimble Nantes S.A.S., Carquefoux (FR)

(72) Inventors: Stéphane Mellier, Carquefoux (FR); Eric Moisset, Carquefoux (FR); Charles Lemaire, Carquefoux (FR)

(73) Assignee: Trimble Nantes S.A.S., Carquefoux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,552

(22) Filed: Jul. 26, 2022

(65) Prior Publication Data

US 2022/0357466 A1    Nov. 10, 2022

Related U.S. Application Data

(63) Continuation of application No. 16/450,702, filed on Jun. 24, 2019, now Pat. No. 11,460,589.

(30) Foreign Application Priority Data

Jul. 20, 2018    (EP) .................................... 18290087

(51) Int. Cl.
   *G01C 15/00*      (2006.01)
   *G01S 19/43*      (2010.01)
   (Continued)

(52) U.S. Cl.
   CPC ............ *G01C 15/008* (2013.01); *G01S 19/35* (2013.01); *G01S 19/43* (2013.01); *G01S 19/48* (2013.01); *G01S 19/51* (2013.01)

(58) Field of Classification Search
   CPC ....... G01C 15/008; G01S 19/35; G01S 19/43; G01S 19/48; G01S 19/51
   See application file for complete search history.

(56) References Cited

U.S. PATENT DOCUMENTS 11,460,589 B2    10/2022    Mellier et al.
2011/0064312 A1    3/2011    Janky et al.
(Continued)

OTHER PUBLICATIONS

Extended European Search Report for Application No. 22161701.2-1206, dated Jul. 1, 2022, 12 pages.
(Continued)

*Primary Examiner* — Anne Marie Antonucci
*Assistant Examiner* — Jared C Bean
(74) *Attorney, Agent, or Firm* — KILPATRICK TOWNSEND & STOCKTON LLP

(57) ABSTRACT

Embodiments provide for methods and portable positioning devices adapted to determine a geospatial position of a point of interest. In one embodiment, the portable positioning device comprises an antenna, a levelling detector, an imaging device, a display unit and a processing unit. The antenna may be adapted to receive satellite information signals. The levelling detector is arranged relative to the antenna for detecting whether the antenna is positioned horizontally. The imaging device has an optical axis and a sighting axis. In one embodiment, the sighting axis intersects an antenna axis. In another embodiment, the sighting axis is aligned with the antenna axis. The display unit may be provided for assisting in identifying the point of interest within a field of view of the imaging device and for assisting in identifying whether the antenna is horizontally levelled and whether a phase center and the point of interest are vertically aligned.

18 Claims, 10 Drawing Sheets

(51) Int. Cl.
    *G01S 19/48*          (2010.01)
    *G01S 19/51*          (2010.01)
    *G01S 19/35*          (2010.01)

(56) References Cited

U.S. PATENT DOCUMENTS

| | | |
|---|---|---|
| 2011/0075886 A1 | 3/2011 | Ashjaee et al. |
| 2013/0162469 A1 | 6/2013 | Zogg et al. |
| 2014/0081571 A1 | 3/2014 | Briggs et al. |
| 2016/0033649 A1* | 2/2016 | Mathews .............. G01S 19/246 |
| | | 342/357.48 |
| 2016/0035096 A1* | 2/2016 | Rudow .................... G06T 7/60 |
| | | 348/135 |
| 2018/0017384 A1 | 1/2018 | Siercks et al. |
| 2020/0025944 A1 | 1/2020 | Mellier et al. |

OTHER PUBLICATIONS

"Polar X6 Dual-Frequency Handheld Receiver", South Surveying & Mapping Instrument Co., Ltd.; South Target your success, 2 pages.

Extended European Search Report for Application No. 18290087.8, dated Jan. 23, 2019, 11 pages.

U.S. Appl. No. 16/450,702 First Action Interview Pilot Program Pre-Interview Communication, dated Dec. 16, 2021, 5 pages.

U.S. Appl. No. 16/450,702 First Action Interview Office Action Summary dated Mar. 9, 2022, 5 pages.

U.S. Appl. No. 16/450,702 Notice of Allowance dated May 23, 2022, 10 pages.

\* cited by examiner

METHODS FOR OBTAINING A GEOSPATIAL POSITION USING A POSITIONING DEVICE

CROSS-REFERENCE TO RELATED APPLICATIONS

The present application is a Continuation of U.S. application Ser. No. 16/450,702, filed Jun. 24, 2019, which claims priority to EPC Application No. 18290087.8, filed Jul. 20, 2018, the contents of which are incorporated herein by reference in their entirety for all purposes.

TECHNICAL FIELD

The present disclosure relates generally to the field of positioning and, more particularly, to methods and portable positioning devices for obtaining a geospatial position of a point of interest. Positioning devices disclosed herein may provide a two-dimensional, or a three-dimensional, geospatial position of the point of interest.

BACKGROUND

Positioning relates to the art of determining the position of a person, object or system on, or near, the surface of the Earth, i.e. the art of determining the coordinates of a location (latitude, longitude and altitude). Positioning may be of interest in, for example, the technical field of surveying whose purpose is to e.g. establish land maps based on the determination of terrestrial or three-dimensional position of points using the relative distances and angles between these points. In such an application, the resulting land map will be dependent on the absolute position of the surveying system, a component of the surveying system or a surveyed object, as may be determined by a positioning device using signals received from a global navigation satellite system (GNSS).

The position of a terrain point may for example be obtained by means of a survey pole equipped with a pointing tip to place the survey pole at the terrain point of interest and with a GNSS antenna having a so-called "phase center" at which satellite information signals are received. The survey pole may also be equipped with a tilt sensor to level the survey pole so that it is ensured that the phase center of the antenna is vertical over the terrain point. Levelling the pole may however take time and/or be imprecise. Further, as the satellite information signals are received at the phase center of the GNSS antenna, compensation for the length of the pole is necessary in order to compute the three-dimensional position of the terrain point.

Such survey poles are commonly used in surveying applications. However, for such applications and also others, there is still a need of providing new and improved positioning devices. In particular, there is a need of providing more compact positioning devices.

SUMMARY

It is therefore an object of the present invention to overcome at least some of the above mentioned problems, and to provide an improved method and an improved positioning device for obtaining a geospatial position of a point of interest.

This and other objects are achieved by means of a positioning device and a method as defined in the appended independent claims. Other embodiments are defined by the dependent claims.

According to embodiments of the present disclosure, there is provided a portable positioning device comprising an antenna, a levelling detector, an imaging device, a display unit and a processing unit.

The antenna may have a phase center and may be adapted to receive satellite information signals from a GNSS at its phase center. In other words, the portable positioning device is equipped with a GNSS receiving unit including an antenna that is adapted to receive GNSS data. The antenna may be referred to as the GNSS antenna in the following. The antenna also includes an antenna axis which is a vertical axis passing through the phase center of the antenna.

The levelling detector may be arranged relative to the antenna for detecting whether the antenna is positioned horizontally. In other words, the levelling detector may be arranged relative to the antenna for detecting whether the antenna is horizontally levelled, i.e. whether the antenna is positioned parallel to the horizon (or perpendicular to the vertical as defined by the gravity field). The levelling detector may be arranged to detect a deviation from a horizontal position. The levelling detector may be an inclinometer (a tilt sensor) or an inertial measurement unit, for example.

According to a first aspect of the present disclosure, the imaging device may have a sighting axis and the phase center of the antenna may be arranged along, or at least close to, the sighting axis of the imaging device. The display unit may be provided for assisting, for example an operator of the positioning device, in identifying the point of interest within a field of view of the imaging device and for assisting in identifying whether the antenna is horizontally levelled based on an input from the levelling detector and whether the phase center and the point of interest are vertically aligned, or at least close to vertically aligned.

Further, the processing unit may be configured to trigger computation of the geospatial position of the point of interest based on the satellite information signals (or GNSS data) received at the antenna for a position of the positioning device for which an indication that the antenna is horizontally levelled and the phase center of the antenna is vertically, or close to vertically, aligned with the point of interest is received.

According to a second aspect of the present disclosure, the sighting axis of the imaging device may intersect the antenna axis at a certain angle. The sighting axis is an axis passing through a fiducial marker provided in the field of view of the imaging device for assisting in sighting the point of interest. The position of the fiducial marker within the field of view is dependent on a distance at which the positioning device is held above the point of interest. The display unit may be provided for assisting, for example an operator of the positioning device, in identifying the point of interest within a field of view of the imaging device and for assisting in identifying whether the antenna is horizontally levelled based on an input from the levelling detector and whether the point of interest is along the sighting axis. The processing unit may then be configured to trigger computation of the geospatial position of the point of interest based on the satellite information signals (or GNSS data) received at the antenna for a position of the positioning device for which an indication that the antenna is horizontally levelled and that the point of interest is along the sighting axis is received.

According to a third aspect of the present disclosure, the imaging device is inclined with respect to the antenna such that the optical axis intersects the antenna axis. In the present aspect, a projection center of the imaging device, through which the optical axis passes, is located on the antenna axis. The display unit is then provided to assist in sighting the point of interest using a sighting axis and for assisting in identifying whether the antenna is horizontally levelled based on an input from the levelling detector. The sighting axis passes through the projection center and a fiducial marker provided in the field of view of the imaging device for assisting in sighting the point of interest. The fiducial marker is located on the antenna axis. The processing unit is then configured to trigger computation of the geospatial position of the point of interest based on the information satellite signals received at the antenna for a position of the positioning device for which an indication that the antenna is horizontally levelled and the point of interest is along the sighting axis is received.

In some embodiments, the processing unit of the positioning device may be configured to itself compute the geospatial position of the point of interest based on the collected satellite information signals. In these embodiments, the processing unit then computes the geospatial position of the target (or point of interest) for the position of the positioning device for which the indication has been received. An operator of the positioning device may thus position the positioning device above the point of interest such that the antenna is horizontally levelled and the phase center is vertically, or close to vertically, aligned with the point of interest, and the processing unit may, based on an indication that these conditions are fulfilled (i.e. the horizontal and vertical levelling of the positioning device), computes the geospatial position of the point of interest for this position of the device. However, in some other embodiments, the positioning device (or its processing unit) may be in communication with a server, or an external device, having another processing unit at which computation of the geospatial positon may be performed based on information related to the collected satellite information signals. The processing unit at which the geospatial position is computed may for example reside inside a remote server located within an internet cloud infrastructure. The positioning device (or its processing unit) may then be adapted to provide the server, or the external device, either with the geospatial position computed at the positioning device or with the GNSS data collected and/or detected by the GNSS antenna, the levelling detector, the display unit and/or the imaging device. In the latter case, the positioning device may then receive the geospatial position computed by the server or the external device such that it may, for example, be displayed to an operator of the positioning device.

It will be appreciated that the processing unit may also be referred to as a collector unit as the primary function of the processing unit is to collect the satellite information signals received at the antenna for obtaining the geospatial position of the point of interest. The processing unit or collector unit may then be in communication with the GNSS receiving unit including the GNSS antenna to receive the data. If the computation of the geospatial position of the point of interest is performed at a remote processing unit, the processing unit or collector unit is then in communication with this remote processing unit to transmit information based on the collected satellite information signals. For example, this information may be raw GNSS measurements or a digitization of the collected satellite information signals.

Further, the processing unit may also be referred to as a control unit as the same unit may have the function of computing the geospatial position of the point of interest and the function of controlling the display unit and/or the imaging device, for example.

In some other embodiments, these functions of collecting, controlling and processing may be located in separate units in communication with each other.

According to an embodiment, there is provided a method implemented in a positioning device comprising an antenna, a levelling detector, a display unit and an imaging device. The antenna may be adapted to receive satellite information signals from a global navigation satellite system and the antenna may have a phase center. The levelling detector may be arranged relative to the antenna for detecting whether the antenna is positioned horizontally. The imaging device has a sighting axis and the phase center of the antenna is arranged along, or at least close to, the sighting axis. The method implemented in the positioning device may comprise determining whether the antenna is horizontally levelled based on an input from the levelling detector, displaying the determination on the display unit for assisting (for example a user) in identifying whether the antenna is horizontally levelled and displaying, on the display unit, images captured by the imaging device for assisting (the user) in identifying a point of interest within a field of view of the imaging device and in identifying whether the phase center of the antenna and the point of interest are vertically, or at least close to vertically, aligned. Based on an indication that the antenna is horizontally levelled and that the phase center and the point of interest are vertically aligned, or at least close to vertically aligned, the method further includes triggering computation of the geospatial position of the point of interest based on the information satellite signals received at the antenna for the position of the positioning device for which the indication is received.

According to another embodiment, there is provided a method which is equivalent to the method described above except that the sighting axis, which passes through a fiducial marker provided in the field of view of the imaging device for assisting in sighting the point of interest, intersects the antenna axis, which is the vertical axis passing through the phase center of the antenna. In the present embodiment, the position of the fiducial marker within the field of view is dependent on a distance at which the positioning device is held above the point of interest. Based on an indication that the antenna is horizontally levelled and the point of interest is along the sighting axis, the method includes triggering computation of the geospatial position of the point of interest based on the information satellite signals received at the antenna for the position of the positioning device for which the indication is received. In the present embodiment, the imaging device is inclined with respect to the antenna such that the optical axis intersects the antenna axis.

According to yet another embodiment, there is provided a method which is equivalent to the method described in the preceding embodiment except that a projection center of the imaging device, through which the optical axis passes, is located on the antenna axis. In the present embodiment, the sighting axis and the antenna axis coincides. The sighting axis passes through the projection center and the fiducial marker provided in the field of view of the imaging device for assisting in sighting the point of interest. The fiducial marker is located on the antenna axis. Based on an indication that the antenna is horizontally levelled and the point of interest is along the sighting axis, the method includes triggering computation of the geospatial position of the point of interest based on the information satellite signals received at the antenna for the position of the positioning device for which the indication is received.

As mentioned above, the methods may either include computing the geospatial position of the point of interest locally at the positioning device or transmitting information based on the satellite information signals (GNSS data) collected/detected by the GNSS antenna to a remote/external processing unit for obtaining the geospatial position.

It will be appreciated that, in the above embodiments, the indication that the antenna is horizontally levelled and that the phase center and the point of interest are vertically aligned, or at least close to vertically aligned (or in other words that the point of interest is along the sighting axis), i.e. the trigger for computing the geospatial position of the point of interest may be a user input. By means of the information provided at the display unit with respect to the horizontal levelling of the antenna and the positioning of the phase center vertically above the point of interest, the operator of the positioning device can decide whether the horizontal levelling and the vertical positioning is satisfying and then trigger the computation of the geospatial position of the point of interest based on the collected GNSS data. Alternatively, if the positioning device first receives a user input identifying the point of interest, for example by means of the imaging device and the display unit, the positioning device may itself detect when the antenna is horizontally levelled and when the phase center of the imaging device is placed vertically, or at least close to vertically, over the point of interest.

It will also be appreciated that the GNSS data, are continuously collected at the antenna of the GNSS receiving unit and the position of the point of interest is computed from previously collected GNSS data at the exact time when the device is horizontally levelled and the phase center is vertically, or at least close to vertically, aligned with the point of interest. In other words, the positioning device may be configured to trigger the computation of the position of the GNSS antenna phase center based on the previously collected raw data upon reception of an indication that the antenna is horizontally levelled and the phase center is vertically aligned. In other embodiments, the collection of the raw data may occur once the indication is received.

The embodiments described in the following apply equally to the portable positioning devices or the methods defined in the aspects and embodiments described above, unless explicitly mentioned otherwise.

The method and the portable positioning device according to the present embodiments rely on the use of an imaging device, such as a camera, to assist in horizontally levelling the antenna together with a levelling detector and to assist in aligning the phase center of the antenna vertically over the point of interest. Accordingly, the method and the portable positioning device do not necessitate a pole with a pointing tip, which usually is heavy and cumbersome. As such, the method and the portable positioning device according to the present embodiments provide for a contactless procedure. Further, the portable positioning device is lighter and more compact. The portable positioning device may be handheld like a smartphone or the like.

The embodiments of the present disclosure provide new methods and positioning devices in which the horizontal levelling of the device can be obtained using the levelling detector and an image captured by the imaging device, which may conveniently be displayed on the display unit. In particular, an operator of the portable positioning device may orient the device towards the point of interest and use the display unit to identify the point of interest within the field of view of the imaging device. As will be further explained in the following, indicators may, in some embodiments, be provided to indicate to the operator that the antenna is horizontally levelled. Further, the operator may also use the display unit to identify whether the phase center of the GNSS antenna and the point of interest are vertically, or at least close to vertically, aligned.

In some other embodiments, the portable positioning device may be implemented based on an existing device already including a processing unit and a display unit, to which a module including the GNSS antenna, the levelling detector (or inclinometer) and the imaging device is added. In other embodiments based on an existing device including also an imaging device, the add-on module may only include a GNSS antenna and a levelling detector (inclinometer).

It will be appreciated that a position computed or obtained based on the satellite information signals, as such, is a position at the so-called "phase center" of the GNSS antenna, which is a location generally near the mechanical center of the antenna. For this reason, the geospatial position of the point of interest (or the antenna) is computed or obtained once the phase center of the antenna is vertically, or at least close to vertically, aligned with the point of interest.

Further, the GNSS antenna may be a single frequency antenna configured to operate at a single frequency (L) or a multiple frequency antenna configured to operate at multiple frequencies (L1, L2, . . . , Ln). In the case of a multiple frequency antenna, the position of the phase center in the antenna may vary from one frequency to another. However, the phase center may be selected to correspond to the phase center for the frequency L1.

In the absence of information about the distance from the phase center of the antenna to the point of interest, the portable positioning device of the present embodiments provides a two-dimensional geospatial position of the point of interest.

The accuracy of the two-dimensional geospatial position may depend on different factors among which the accuracy of the GNSS board (or GNSS receiver). However, using a GNSS board with a centimeter-level precision, a two-dimensional geospatial position with a centimeter accuracy can be obtained since the portable positioning device or the method enables for an accurate positioning, both horizontally and vertically, over the point of interest.

Other factors affecting the accuracy of the two-dimensional geospatial position obtained or computed by the positioning device include for example the accuracy of the levelling detector and the mechanical tolerances in the arrangement of the different elements of the device. A calibration procedure may be performed to calibrate the positioning device and thereby compensate for, or at least reduce, the effect of these variations/errors. Each positioning device may have its own calibration model. It may be envisaged that the calibration procedure is performed at the factory stage or on field, depending on time of use and/or changes in environmental conditions such as temperature.

As mentioned above, according to a first aspect of the present disclosure, it is beneficial to arrange the phase center of the GNSS antenna along, or at least close to, the sighting axis of the imaging device.

In some embodiments of the first aspect, the phase center of the GNSS antenna is arranged along, or at least close to, the optical axis of the imaging device. In this configuration, the sighting axis and the optical axis of the imaging device may therefore coincide.

According to a second aspect and other embodiments, the antenna axis is arranged to interest the sighting axis. In other words, an angle is formed between the sighting axis and the antenna axis. In the present embodiments, a position of the fiducial marker within the field of view of the imaging device is dependent on a distance at which the positioning device is held above the point of interest. This distance may be entered by an operator of the device or may be measured by means of a distance determining module. In the present embodiments, the imaging device is inclined with respect to the antenna such that both the optical axis and the sighting axis intersect the antenna axis.

According to a third aspect and yet other embodiments, the antenna axis and the sighting axis coincide and the optical axis intersects the antenna axis at a certain angle. In the present embodiments, a projection center of the imaging device, through which the optical axis passes, is located on the antenna axis. Further, a fiducial marker provided in the field of view of the imaging device for defining the sighting axis is located on the antenna axis.

By "optical axis" it is herein meant the axis of rotational symmetry of the imaging device, which may correspond for example to the axis passing through the center of a lens of the imaging device or through the center of an image sensor (or a focal point or projection center) of the imaging device.

As mentioned above, in some embodiments, the phase center may be arranged along, or at least close to, the optical axis of the imaging device.

Once the operator of the portable positioning device has horizontally levelled the antenna and positioned its phase center vertically over the point of interest (by means of the display unit displaying an image captured by the imaging device and an input from the levelling detector, as explained above), the two-dimensional geospatial position (latitude and longitude) of the phase center corresponds to the two-dimensional geospatial position of the point of interest. The two-dimensional geospatial position of the point of interest can therefore be obtained, or computed, based on the satellite information signals received by the antenna at this position of the positioning device.

In some other embodiments however, as mentioned above, the phase center may be arranged along, or at least close to, the sighting axis of the imaging device. The sighting axis may be an axis used for sighting towards a target or point of interest.

By sighting axis is herein meant an axis passing through a fiducial maker and a projection center of the optical system of the imaging device, such as, for example, the center of the lens of the imaging device. It will be appreciated that, while the imaging device is characterized by a single optical axis, the sighting axis is dependent on the position of its fiducial marker. Thus, an imaging device may have several sighting axes.

In some configurations, the placement of the fiducial marker is adjusted as a function of the distance (the height) of the positioning device over the point of interest to perform a particular measurement since, for a given sighting axis, the intersection between the sighting axis and the (ground) surface observed by the imaging device will depend on the height at which the positioning device is held by the operator. The distance from the positioning device to the (ground) surface may be measured, or estimated, by a distance measuring module, such as a laser rangefinder or the like, or may be input by a user of the positioning device.

Expressed differently, it may also be appreciated that the phase center of the GNSS antenna may be arranged within the plane in which the GNSS antenna extends. The GNSS antenna may then have an "antenna axis" which is perpendicular to this plane and passes through the phase center. The GNSS antenna and the imaging device may then be arranged in the positioning device such that the sighting axis and the antenna axis coincide, or at least almost coincide. In particular, the angle formed between the sighting axis and the antenna axis may be lower than five degrees. In this case, the height of the positioning device over the (ground) surface may be estimated with an accuracy of about +/−10 centimeters to guarantee a determination of the 2D position at a centimeter-grade accuracy. Indeed, assuming that the operator makes an error of 10 cm in estimating the height (for example inputting 1.2 meter while the height should be 1.3 meter), or assuming that the height is measured with an error of 10 cm, the error in the 2D position of the point of interest is equal to 10×tangent (5°) cm, i.e. 0.87 cm, which is approximately one centimeter.

It will be appreciated that, in the configuration in which the phase center is aligned along the optical axis of the imaging device (and the sighting axis thereby coincides with the antenna axis and the optical axis of the imaging device), it is not necessary to adjust the placement of the fiducial marker and the height does not need to be determined.

Similarly, in the configuration in which the antenna axis and the sighting coincide and in which the projection center of the imaging device and the fiducial marker are arranged along the antenna axis, it is also not necessary to determine the height at which the positioning device is held above the point of interest.

In the configuration in which the antenna axis intersects both the optical axis and the sighting axis, i.e. in the configuration in which the projection center of the imaging device is not along the antenna axis, the distance from the positioning device to the point of interest is needed in order to determine the position of the fiducial marker in the field of view of the imaging device.

Although it is an operator who manipulates the positioning device for levelling purposes and vertical alignment, the positioning device may be configured to detect when the phase center of the GNSS antenna is placed vertically above the point of interest by identification of the point of interest in the field of view of the imaging device and based on input from the levelling detector.

According to an embodiment, the processing unit may be further configured to obtain or compute a three-dimensional geospatial position of the point of interest based on the received satellite information signals and a distance (or height) from the antenna to the point of interest.

As mentioned above, the satellite information signals are received at the phase center of the antenna and, thus, a three-dimensional geospatial position computed or obtained directly by the processing unit from the received satellite information signals correspond to the three-dimensional geospatial position of the phase center of the antenna. However, the target point (or point of interest) for the operator of the portable positioning device (the "surveyor") is not at the antenna but rather at the point of interest visible in the field of view of the imaging device, such as, for example, a terrain point (i.e. a point on the ground). Therefore, the three-dimensional geospatial position of the point of interest corresponds to the three-dimensional geospatial position of the phase center of the antenna but compensated for the distance (or height) between the phase center of the antenna and the point of interest. In other words, the altitude of the three-dimensional geospatial position of the phase center of the antenna is corrected by the distance from the phase center of the antenna to the point of interest when the phase center of the GNSS antenna is vertically above the point of interest and horizontally levelled in order to collect the GNSS data for computing, or obtaining, the three-dimensional geospatial position of the point of interest.

It will be appreciated that the point of interest does not necessarily need to be a terrain point but may be elevated such as a point located on the roof of a building.

According to an embodiment, the portable positioning device may further comprise a distance determining module configured to assist in obtaining the distance from the phase center of the antenna to the point of interest. Based on a known spatial relationship between the phase center of the antenna and the distance determining module, a distance from the phase center of the antenna to the point of interest may be obtained.

In some embodiments, the distance determining module may include at least one of an electronic distance meter (EDM), an optoelectronic distance meter, an ultrasonic sensor, a time-of-flight sensor, or a camera. Using for example an EDM or a time-of-flight sensor, the distance between the distance determining module and the point of interest can be measured based on a known speed of light and the time it takes for a light pulse to travel between the EDM, or time-of-flight sensor, and the point of interest.

Alternatively, or in addition, the distance may be obtained by means of an imaging device or camera. It will be appreciated that the imaging device of the portable positioning device may, in some embodiments, be used to obtain the distance from the antenna to the point of interest but that the portable positioning device may be equipped with an additional camera dedicated for this purpose.

According to an embodiment, the processing unit is further configured to collect a series of images of a ground surface, including the point of interest, captured by the imaging device, collect satellite information signals received at the antenna for at least a subset of the captured images and collect a reference image captured by the imaging device based on the indication (for example a user input) that the antenna is levelled and the phase center is vertically, or close to vertically, aligned with the point of interest (or that the point of interest is along the sighting axis). As an alternative to, or in addition to, the collection of satellite information signals received at the antenna, the processing unit may be configured to collect input from an inertial measurement unit (IMU) of the positioning device for at least a subset of the captured images.

As mentioned above, the device may be configured to cause the imaging device to capture a series of images of a (ground) surface including the point of interest. In other words, a series of images, or a video, of the surface around, and including the point of interest, is obtained with the imaging device.

The positioning device may then be configured to obtain the distance to the point of interest by means of the processing unit of the positioning device or a processing unit of a server in communication with the positioning device in accordance with the following procedure.

The processing unit may be configured to orientate, in a local coordinate system, the series of images of the ground surface captured by the imaging device with respect to each other. A 3D reconstruction of the surface (in which the point of interest is located) may then be generated in the local coordinate system using the orientated images. The surface imaged by the imagining device may be referred to as a ground surface. However, as mentioned above, the point of interest is not necessarily located on the ground.

A scale for the 3D reconstruction may then be established based on information relating to the motion speed of the positioning device during capture of the series of images (or the scan). For this purpose, the procedure includes the collection of the positions of the antenna in a global coordinate system (i.e. a coordinate system of the GNSS) for at least a subset of the captured images based on the collected satellite information signals received at the antenna (while capturing the images in question). Further, following the orientation of the images in the local coordinate system, the positions of the imaging device for at least some of the images of the subset in the local coordinate system are determined. As a result, a first list including positions of the antenna in the coordinate system used by the GNSS and a second list including positions of the imaging device in the local coordinate system are obtained. Based on a known spatial position of the GNSS antenna relative to the imaging device within the positioning device (which may be referred to as an antenna offset within the positioning device) and the information from these two lists, a scale factor between the local coordinate system and the global coordinate system can be determined. As a result, a scale of the 3D reconstruction can be obtained.

As an alternative, or in addition, to the use of the satellite information signals collected at the GNSS antenna for at least some of the images of the subset, the scale factor between the local coordinate system and the coordinate system used by the GNSS may be established based on data obtained from an inertial measurement unit (IMU) providing acceleration and gyroscopic data. The IMU may, for example, be the device used as a levelling detector to determine whether the antenna is horizontally levelled. The information about the motion speed of the positioning device during the capture of the series of images, or the video, may be obtained by another inertial sensor, such as an accelerometer or the like, mounted on the portable positioning device.

Thus, a scale factor between the local coordinate system and the global coordinate system can be determined based on a known spatial position of the IMU relative to the imaging device within the positioning device, the determined positions of the IMU in the global coordinate system and the corresponding positions of the imaging device in the local coordinate system for the at least some images of the subset.

As mentioned above, the portable positioning device may be configured to cause the imaging device to capture a reference image when the antenna is levelled and vertically, or close to vertically, aligned with the point of interest.

A distance from the imaging device to one or more sampling points (or points of a sampling area) of the 3D reconstruction located in the vicinity of the point of interest (i.e. surrounding the point of interest) may then be determined. This distance may then be referred to as a sampling distance as it represents a distance not to the point of interest but to one or more sampling points or to a sampling area. The distance/height from the antenna to the point of interest may then be determined based on the determined sampling distance, the determined scale, the known spatial relationship between the antenna and the imaging device and the angle between the sighting axis when capturing the reference image and a direction to one or more sampling points or to the sampling area. Once the sampling distance and the scale have been determined, the distance from the imaging device to the point of interest may be determined using trigonometry.

It will be appreciated that, in the present procedure, the scale of the 3D reconstruction of the scene may be determined based on the data obtained from at least two images captured at two different positions of the imaging device involving a certain horizontal displacement (i.e. at two different positions being non purely vertical).

According to an embodiment, the levelling detector may be arranged in a plane having a known spatial position relative to the plane in which the antenna is arranged. Information about the known spatial position of the levelling detector relative to the plane in which the antenna is arranged in the positioning device may be input to the processing unit, or another control unit, of the portable positioning device. The information may be obtained at the manufacturing stage of the portable positioning device or via calibration. The processing unit or the control unit may then derive, from such information, a position of the levelling detector at which the antenna is horizontally levelled. The portable positioning device may then, during levelling operations, indicate to the operator of the positioning device whether the antenna is horizontally levelled based on input from the levelling detector.

According to an embodiment, the levelling detector may be arranged in a plane parallel to, or at least substantially parallel to, the plane in which the antenna is arranged. In the present embodiment, the levelling detector may intentionally be arranged parallel to the antenna such that, when the levelling detector is horizontally levelled, the antenna is then also horizontally levelled.

The levelling detector may be an instrument adapted to measure a tilt or angle with respect to gravity (or the gravitational field of Earth). The levelling detector may be an inclinometer (or clinometer), which may also be referred to as a tilt sensor. The inclinometer or tilt sensor may for example include an accelerometer to measure the tilt angle with respect to the Earth's ground plane. In some embodiments, the levelling detector may include an inertial measurement unit (IMU) which is an electronic device using a combination of accelerometers and gyroscopes to provide information about the inclination of the antenna of the portable positioning device.

According to an embodiment, the portable positioning device may be further configured to provide indicators representative of the levelling of the antenna as detected by the levelling detector (inclinometer). Different types of indicators may be envisaged to indicate to the operator whether the antenna is horizontally levelled. The indicators may also indicate how the operator is supposed to orient the portable positioning device such that the antenna becomes horizontally aligned/levelled.

According to an embodiment, the indicators may be displayed on the display unit. In the present embodiment, visual indicators are provided to the operator via the display unit. Examples of such indicators will be described in the following detailed embodiments.

As mentioned above, in some embodiments according to the first aspect of the present disclosure, the phase center of the imaging device may be arranged along the optical axis of the imaging device. More particularly, in some embodiments, the phase center of the antenna may be aligned with a center of an image sensor of the imaging device along the optical axis.

The imaging device may be a digital camera including an image sensor such as a semiconductor charge-coupled device (CCD), a complementary metal-oxide-semiconductor (CMOS) sensor or another active digital pixel sensor. The phase center of the antenna may then be aligned with a center of such an image sensor along the optical axis of the imaging device such that, when the center of the image sensor is positioned vertically over the point of interest, then the phase center of the antenna will also be positioned vertically over the point of interest. A computation of the satellite information signals received at the phase center of the antenna will then provide a 2D position of the point of interest and, via compensation for the distance/height from the phase center to the point of interest, provide a 3D position of the point of interest. The accuracy of the measurement will then be limited by the accuracy of the GNSS receiver. With present GNSS technology, a determination of the 2D or 3D position of the point of interest at a centimeter-level precision is envisaged.

According to an embodiment, the portable positioning device may further comprise at least one fiducial marker in the field of view of the imaging device for assisting in sighting the point of interest. A fiducial marker in the form of, for example, a cross or a dot may be provided for assisting the operator in sighting the point of interest. The fiducial marker defines, together with the optic system of the imaging device, a sighting axis of the imaging device.

As mentioned above, in embodiments according to the second aspect of the present disclosure, the antenna axis may intersect both the optical axis and the sighting axis. In this configuration, the projection center of the imaging device is not along the antenna axis. The distance from the positioning device to the point of interest is then used to determine the position of the fiducial marker in the field of view of the imaging device.

Further, in embodiments according to the third aspect of the present disclosure, the antenna axis and the sighting may coincide and a projection center of the imaging device is located along the antenna axis. In this configuration, the fiducial marker may be arranged along the antenna axis.

According to an embodiment, the portable positioning device may further comprise a body including a first portion for holding the positioning device and a second portion in which at least the antenna and the inclinometer are arranged. It will be appreciated that the portable positioning device may be implemented with different designs and arrangements of the antenna, the levelling device, the imaging device and the display unit. In another example, the portable positioning device may include a body in which the portion intended to be used for holding the positioning device also includes the antenna and the inclinometer.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

DESCRIPTION OF THE DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
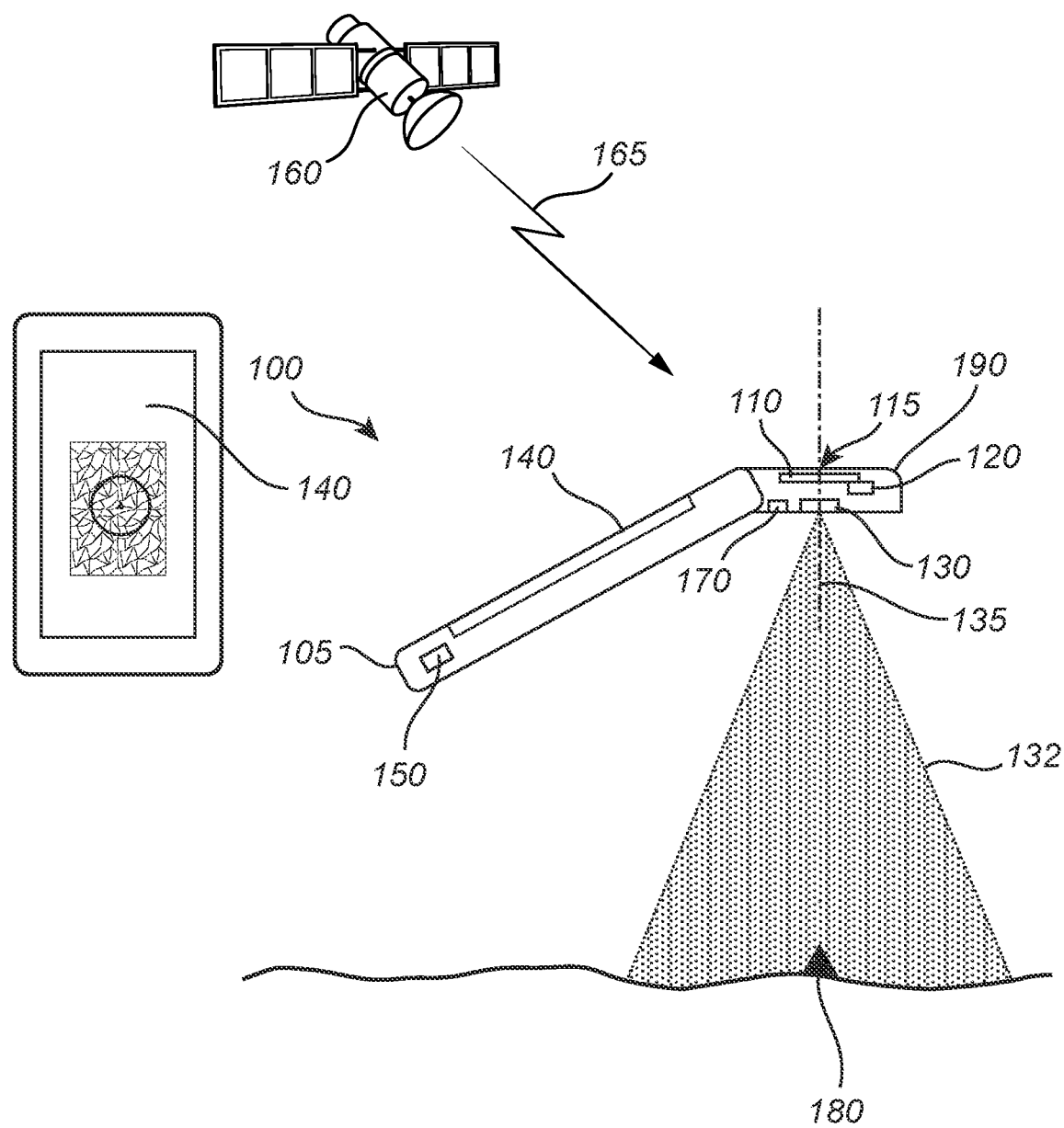
FIG. 1 shows a portable positioning device in accordance with an embodiment.

With reference to FIG. 1, a portable positioning device 100 according to an embodiment is described.

FIG. 1 shows a portable positioning device 100 comprising an antenna 110, a levelling detector 120, an imaging device 130, a display unit 140 and a processing unit 150.

The antenna 110 may have a phase center 115 and may be adapted to receive satellite information signals from a GNSS. One satellite 160 is depicted in FIG. 1 for illustration purposes. The antenna 110 may be adapted to receive signals from four or more space-based orbiting sources (or satellites) of a GNSS. The GNSS antenna 110 may for example include an antenna patch, a ceramic element, a low noise amplifier and filters. The GNSS antenna 110 may be lodged within a housing of the portable positioning device 100.

The GNSS signals may for example be received from any GNSS such as GPS, GLONASS, Galileo, Compass/Beidou, QZSS, SBAS, IRNSS or the like. The antenna 110 may also be referred to as a GNSS antenna 110. The antenna 110 may be connected, or may be part of, a GNSS receiver or GNSS receiver unit or GNSS board. The GNSS receiver may be part of the processing unit 150 and is therefore not shown separately in FIG. 1.

The basic operation principle of a GNSS receiver, or positioning device based on GNSS signals, is to calculate its position by precisely timing the signals sent by satellites of a GNSS. Each of the messages broadcasted by the satellites includes a time stamp indicating the time the message was transmitted from the satellite and the satellite position when the message was transmitted. A distance to each of the satellites may then be derived based on the transit time of each message and the speed of light. Computation of these distances may result in the location (two- or three-dimensional position) of the positioning device.

The levelling detector 120 may be arranged relative to the antenna 110 for detecting whether the antenna 110 is horizontally levelled. The levelling detector 120 may be an inclinometer or an inertial measurement unit (IMU) arranged relative to the antenna 110 for detecting whether the antenna 110 is horizontally levelled (i.e. the plane in which the antenna 110 extends is perpendicular to gravity). In the following, reference will be made to an inclinometer as a levelling detector but reference may have been equally made to an IMU. The IMU may include one or more accelerometers and/or one or more gyroscopes and provide acceleration and gyroscopic data about the motion of the positioning device 100.

In particular, the inclinometer 120 may be arranged in a known spatial relationship with respect to the antenna 110. Based on this known spatial relationship and an input provided by the inclinometer, the processing unit 150 of the portable positioning device 100 can determine whether the antenna 110 is horizontally levelled. The determination made by the processing unit 150 may then be output to an operator of the positioning device via the display unit 140.

In the embodiment shown in FIG. 1, the inclinometer 120 is arranged in a plane parallel, or at least substantially parallel, to the plane in which the antenna 110 is arranged. As such, if the inclinometer 120 is not horizontally levelled, then the antenna 110 is not horizontally levelled either, and vice versa.

The antenna 110 may conveniently be arranged parallel to the outside surface of the housing or the body of the portable positioning device such that, when an operator feels that the portable positioning device is horizontally levelled, the antenna 110 is also horizontally levelled.

The imaging device 130 may have a sighting axis, or optical axis, 135 as determined by, for example, the axis or line along which there is rotational symmetry in the imaging device. In the configuration shown in FIG. 1, the optical axis and the sighting axis of the imaging device coincides such that reference may be made to the optical axis, and not the sighting axis, in the following. The optical axis 135 of the imaging device 130 may for example correspond to the axis passing through the center of lens of the imaging device or the axis passing through the center of the image sensor of the imaging device. As mentioned, in the present embodiment, the optical axis 135 of the imaging device 130 corresponds to the line of sight of the imaging device 130.

As shown in FIG. 1, the phase center 115 of the antenna 110 may be arranged along the optical axis 135 of the imaging device 130. In other words, the antenna 110 and the imaging device 130 are coaxially aligned. In particular, an image sensor of the imaging device 130 and the antenna 110 may be arranged parallel, or at least substantially parallel, to each other.

Further, the antenna 110 is arranged at a face or side of the imaging device 130 opposite to the face or side at which images are captured (i.e. the face sensitive to electromagnetic radiation for imaging). Expressed differently, the imaging device 130 has a sensitive area for imaging and the antenna 110 is arranged at the face or side of the imaging device opposite to the face of side at which this sensitive area is arranged.

When an operator holds the portable positioning device 100 with the imaging device 130 facing downwards for imaging the point of interest (or the ground), the antenna 110 is then arranged above the imaging device 130 within the portable positioning device 100. Again, this corresponds to the configuration of the embodiment shown in FIG. 1. In some other embodiments, the imaging device may be arranged such that the optical axis does not coincide with the antenna axis.

The display unit 140 may be provided for assisting an operator of the portable positioning device 100 in identifying a point of interest 180 within a field of view 132 of the imaging device 130. FIG. 1 shows a front view of the display unit 140 in which an image of the ground within the field of view 132 of the imaging device 130 is displayed. The point of interest 180 can be identified by a triangle in the image displayed in the display unit 140.

FIG. 1 represents a scenario in which the portable positioning device 100 may be used by an operator (not shown) wishing to obtain the 2D or 3D geospatial position of the point of interest 180 located on the ground. For this purpose, the operator may hold a first part or body 105 of the portable positioning device 100 over a zone including the point of interest 180.

The display unit 140 may also be adapted to assist in identifying whether the antenna is horizontally levelled based on an input obtained by the inclinometer 120 and whether the phase center 115 and the point of interest 180 are vertically aligned, or at least close to vertically aligned.

Figure 4:
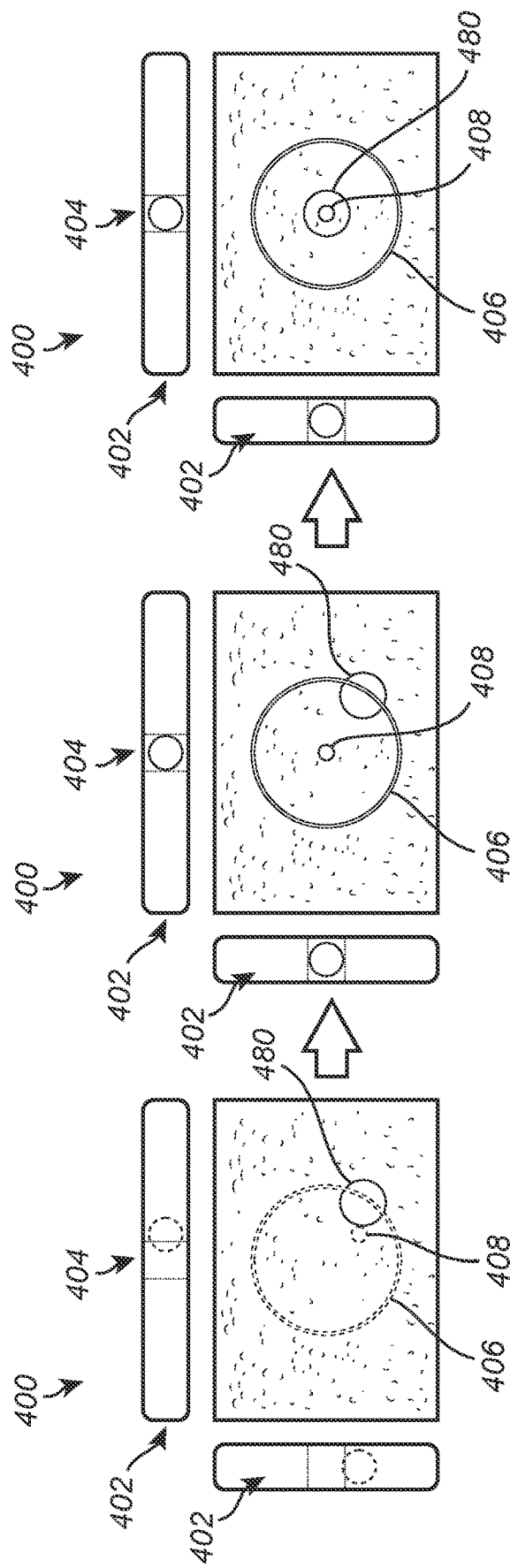
FIGS. 4*a*-4*c* show an embodiment of a display unit of a portable positioning device in accordance with an embodiment.

A procedure for horizontally levelling the antenna 110 using the display unit 140 and for vertically aligning the phase center 115 of the antenna 110 with the point of interest 180 will be described in the following with reference to FIG. 4.

Upon reception of an indication that the antenna 110 is horizontally levelled and the phase center 115 of the antenna 110 is vertically, or close to vertically, aligned with the point of interest 180, the positioning device may be configured to obtain a two-dimensional geospatial position of the point of interest 180 based on satellite information signals 165 received at the antenna for the position of the positioning device at which the indication has been received. In particular, the latitude and longitude of the phase center 115 of the antenna 110 corresponds to the latitude and the longitude of the point of interest 180. The geospatial position of the point of interest may be computed locally by the processing unit of the positioning device or may be computed at a remote processing unit of for example a server located within an internet cloud infrastructure. In the latter case, the positioning device may be configured to transmit information based on the collected satellite information signals 165 to the remote processing unit.

Still referring to FIG. 1, the portable positioning device 100 may also include an optional distance measuring module 170 for measuring the distance from the portable positioning device 100 to the point of interest 180. The processing unit 150 may then be configured to compute, or obtain, a three-dimensional geospatial position of the point of interest 180 based on the received satellite information signals and the distance from the phase center 115 of the antenna 110 to the point of interest 180.

As mentioned above, a computation of the satellite information signals received at the antenna 110 provides a 3D position of the phase center 115 of the antenna 110. While the longitude and the latitude of the phase center 115 of the antenna 110 corresponds to that of the point of interest 180 once the antenna 110 is horizontally levelled and its phase center 115 is positioned vertically over the point of interest 180, the altitude obtained by a computation of the satellite information signals needs to be compensated for by the distance or height from the phase center 115 of the GNSS antenna 110 of the positioning device 100 to the point of interest 180.

For this purpose, the portable positioning device 100 shown in FIG. 1 may also be equipped with an optional distance determining module 170, which may for example be an electronic distance meter, an optoelectronic distance meter, an ultrasonic sensor or a time-of-flight sensor. It will be appreciated that the spatial position of the distance determining module 170 relative to the antenna 110 in the positioning device 100 may be known as the distance measured by the distance determining module 170 to the point of interest may not exactly correspond to the distance from the phase center 115 of the antenna 110 to the point of interest 180 but the distance from a point of the distance determining module 170 to the point of interest.

The distance determining module 170 may for example be based on a measurement with a laser-based measurement device. In particular, a laser pulse may be emitted from the distance determining module 170 towards the point of interest and part of the laser pulse may be reflected at the point of interest and then received at the distance determining module 170. Knowing the speed of light and the time difference between emission of the laser pulse and reception of the reflected signal, the distance to the point of interest may be determined.

Once the distance between the phase center 115 of the antenna 110 and the point of interest 180 is determined, the altitude of the point of interest on Earth may be computed or obtained by the processing unit 150 by correcting the altitude obtained from the received satellite information signals once the antenna is horizontally levelled and placed vertically over the point of interest with the determined distance.

The distance from the phase center 115 of the antenna 110 to the point of interest 180 may also be determined using the imaging device 130 or another imaging device or camera 170. If the imaging device 130 is used, the distance determining module 170 may not be necessary. However, the distance may be determined even more accurately by combining the result obtained by a distance determining module such as an electronic distance meter and the result obtained via the imaging device 130. A procedure for determining the distance based on the imaging device 130 will be described in the following with reference to FIG. 5.

Still referring to FIG. 1, the positioning device 100 may include a first part 105 at which the display unit 140 and the processing unit 150 are arranged.

The first part 105 may for example be a smartphone or the like. The positioning device 100 then includes a second part 190 at which the GNSS antenna 110, the levelling detector 120, the imaging device 130 and the distance determining module 170 may be arranged. As will be further illustrated with reference to FIG. 3, the second part 190 may be in the form of a module adapted to be attached and connected to the first part 105 of the positioning device 100.

Figure 2:
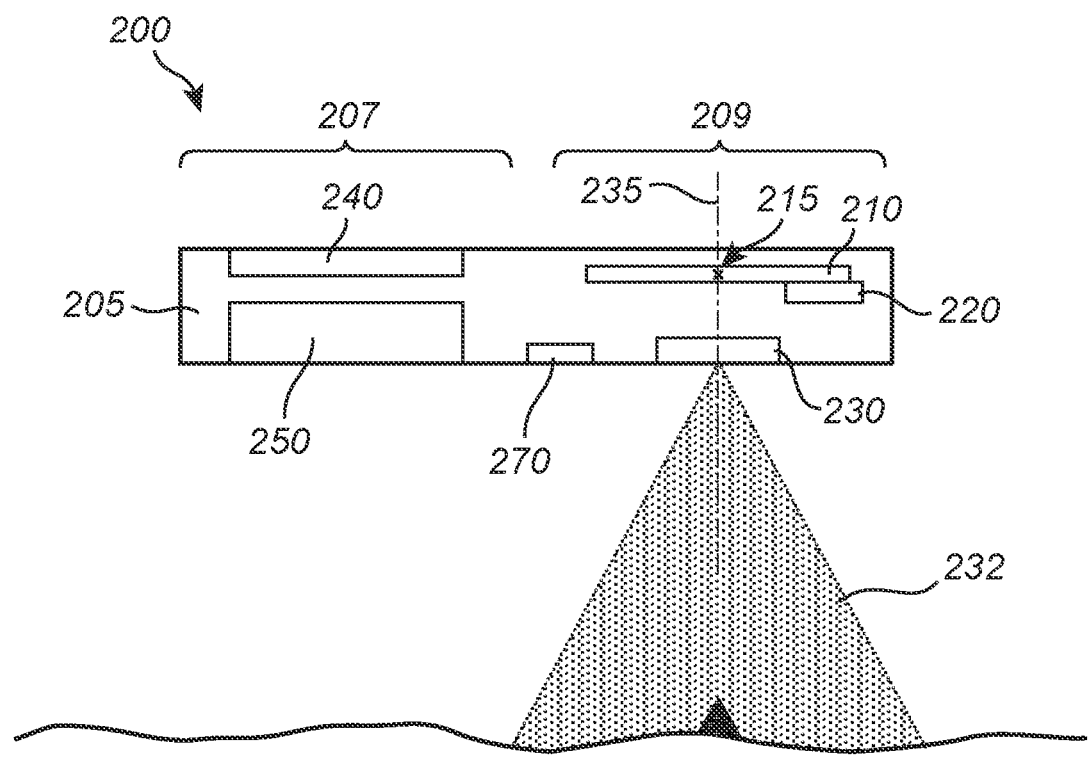
FIG. 2 shows a portable positioning device in accordance with an embodiment.

With reference to FIG. 2, a portable positioning device 200 according to another embodiment is described.

FIG. 2 shows a portable positioning device 200 comprising an antenna 210 having a phase center 215, a levelling detector 220, an imaging device 230 having an optical axis 235 and a field of view 232, a display unit 240, a processing unit 250 and an optional distance determining module 270.

In the embodiment shown in FIG. 2, the processing unit 250 and the display unit 240 are arranged in a first portion 207 of a body 205 of the portable positioning device 200 while the antenna 210, the levelling detector 220 and the imaging device 230 are arranged in a second portion 209 of the body 205.

The portable positioning device 200 may be equivalent to the portable positioning device 100 described with reference to FIG. 1 except that, in the embodiment shown in FIG. 1, the first portion forms a finite angle with respect to the second portion. It will be appreciated that, in the embodiment shown in FIG. 1, the first portion and the second portion may define an angle of about 20-30 degrees, which may provide for a convenient use of the portable positioning device. However, in other embodiments, as shown in FIG. 2, the first portion and the second portion may be aligned, i.e. with a zero angle.

Figure 3:
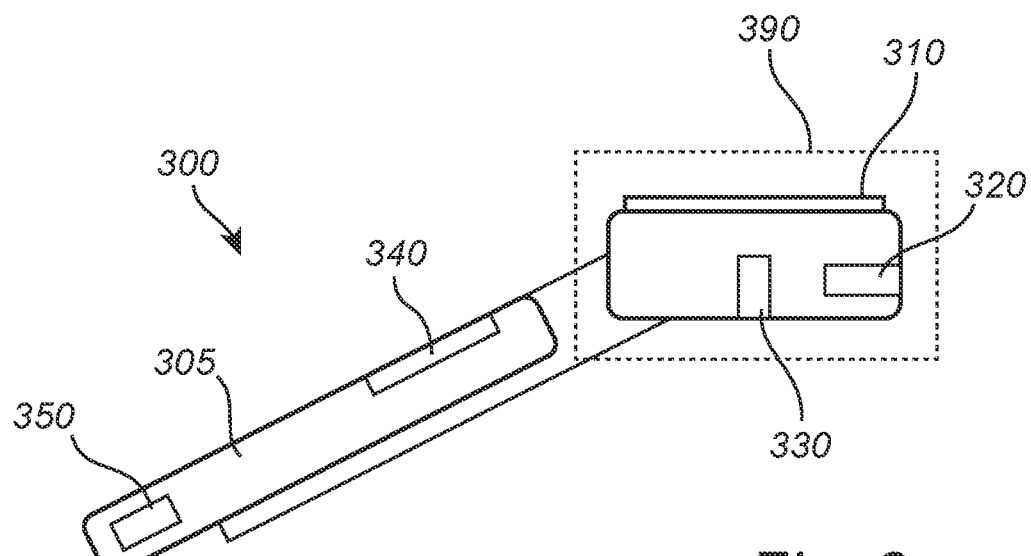
FIG. 3 shows a portable positioning device in accordance with an embodiment.

With reference to FIG. 3, a portable positioning device 300 according to another embodiment is described.

FIG. 3 shows a portable positioning device 300 comprising an antenna 310, a levelling detector 320, an imaging device 330, a display unit 340 and a processing unit 350.

FIG. 3 illustrates an embodiment in which the antenna 310, the inclinometer 320 and the imaging device 330 are provided as an add-on module 390 to an already existing device 305 including a processing unit 350 and a display unit 340. As for the embodiment shown in FIG. 1, the positioning device 300 may include a first part 305 at which the display unit 340 and the processing unit 350 are arranged. The first part 305 may for example be a smartphone or the like. The positioning device 300 then includes a second part, the add-on module, 390 at which the GNSS antenna 310, the levelling detector 320, the imaging device 330 and the optional distance determining module 370 may be arranged.

In some embodiments, the levelling detector 320 may be arranged at the first part 305 of the positioning device 300. In other words, the levelling detector 320 may be part of the device 305 to which the module 390 is connected.

With reference to FIGS. 4a-4c, an embodiment of a display unit 400 of a portable positioning device in accordance with an embodiment is described.

The display unit 400, and the procedure described in the following for levelling the antenna of the portable positioning device and for vertically aligning the phase center of the antenna with the point of interest, may be used in combination with any of the embodiments of portable positioning devices described herein, such as those described with reference to FIGS. 1-3.

FIGS. 4a-4c show a display unit 400 in which an image of a ground surface including a representation 480 of the point of interest is displayed. Indicators 402-408 may be provided in order to horizontally level the antenna and to vertically align the phase center of the antenna with the point of interest.

The display unit 400 shows also two one-dimensional bars 402 placed along two sides of the image in order to control the tilt of the antenna of the positioning device in two respective directions (thereby defining a plane).

In the example shown in FIGS. 4a-4c, a side dot is provided in each one of the two bars together with an area 404 indicating where the side dot should be within each of the respective bars such that the antenna becomes horizontally levelled. The position of the side dot along the bar corresponds to the tilt of the antenna along one direction. It is therefore controlled based on the information provided by the levelling detector (inclinometer) of the positioning device.

As an alternative, or in addition, the display unit (or screen) 400 may also represent a circle 406 in which a fiducial marker 408, such as a pointing or sighting dot 408, representative of the position of the phase center of the antenna in the image should be centered in order to horizontally level the antenna. As explained above and, as will be further illustrated in FIG. 11, if the imaging device is inclined with respect to the plane in which the GNSS antenna is arranged, the sighting axis of the imaging device does not coincide with the antenna axis, and the placement of the fiducial marker may be adjusted based on the height of the positioning device above the point of interest.

The diameter of the circle may depend on the inclination of the antenna and the GNSS accuracy.

In FIG. 4a, the antenna is not horizontally levelled and the two dots on the bars along the two sides of the image are not located within the indicated areas 404. Similarly, the sighting dot 408 is not at the center of the circle 406 represented on the image.

The operator may then move the portable positioning device such that the sighting dot 408 is placed within the center of the circle 406 or such that the side dots are arranged within the indicated areas 404 in the two bars 402.

Once the antenna is horizontally levelled, the side dots, the sighting dot 408 and the circle 406 may switch from being made of a dotted line, or being red, as the case may be, to being made of a continuous line, or green, for example. This manner of indicating that a horizontal levelling of the antenna is reached is only one example and this may be indicated to the operator in various manners. As another example, a sound may be output from the positioning device once the antenna is horizontally levelled. As yet another example, the side dots and/or the circle may start blinking on the display unit once the antenna is horizontally levelled.

The operator may then position the pointing or sighting dot 408 over the representation 480 of the point of interest in the image. The antenna is then horizontally levelled and the phase center of the antenna is vertically aligned over the point of interest. A 2D or 3D position of the point of interest may then be obtained, as described above.

FIGS. 4a-4b illustrate also the workflow to be used by an operator of a portable positioning device according to the embodiments of the present disclosure. The workflow includes a first step in which the antenna becomes horizontally levelled, such as shown in FIGS. 4a and 4b. The workflow then includes a second step in which a fiducial marker (or "collimator") is aligned with the point of interest or target seen in the image captured by the imaging device. It will be appreciated that a fiducial marker is an object placed in the field of view of the imaging device which appears in the image produced by the imaging device. The fiducial marker is herein used as a point of reference assisting the operator in sighting the point of interest. As mentioned above, the placement of the fiducial marker will determine the sighting axis of the imaging device. Once the antenna is horizontally levelled and the phase center of the antenna is placed vertically over the point of interest, the GNSS data for the point of interest can be logged into the portable positioning device in a third step.

Still referring to FIGS. 4a-4c, in order to facilitate and improve the accuracy of the horizontal levelling of the antenna and its positioning over the point of interest, the positioning device may be configured to provide the possibility to zoom in, or out, on the image displayed at its display unit.

Referring to FIGS. 1-3, the processing units 150, 250 and 350 (or the devices in which these processing units are arranged) may also be referred to as, or may also act as, data collectors. Alternatively, a data collector or a memory may be provided so that a plurality of coordinates for a number of point of interest may be logged and stored in the portable positioning device.

With reference to FIGS. 1 and 5-9, a procedure for determining the distance from the positioning device 100 to the point of interest 180 using the imaging device 130 is described. It will be appreciated that this determination may be performed as an alternative or in addition to the determination of the distance based on a distance determining module 170. Further, another imaging device or camera 170 dedicated for such a distance measurement may be provided.

Accordingly, the portable positioning device, via its processing unit 150 or another control unit, may be configured to cause the imaging device 130 to capture a series of images of a (ground) surface including the point of interest 180. In other words, a scan of the surface around, and including the point of interest 180, is performed with the imaging device 130. This may for example be acquired while the operator, holding the portable positioning device with the imaging device 130 facing the ground surface, approaches the point of interest 180.

As described above, the procedure for determining the distance of the positioning device to the point of interest once the antenna is horizontally levelled and placed vertically, or close to vertically, above the point of interest may be performed in the processing unit of the positioning device or in a processing unit of a server in communication with the positioning device. In the latter case, the positioning device is configured to transmit data collected by the imaging device, the GNSS antenna, the levelling device and/or the display unit of the positioning device to the processing unit of the server. Thus, although, it may in the following be referred to the processing unit of the positioning device, the computations involved in the procedure may equally be performed at the processing unit of a server in communication with the positioning device.

Figure 6:
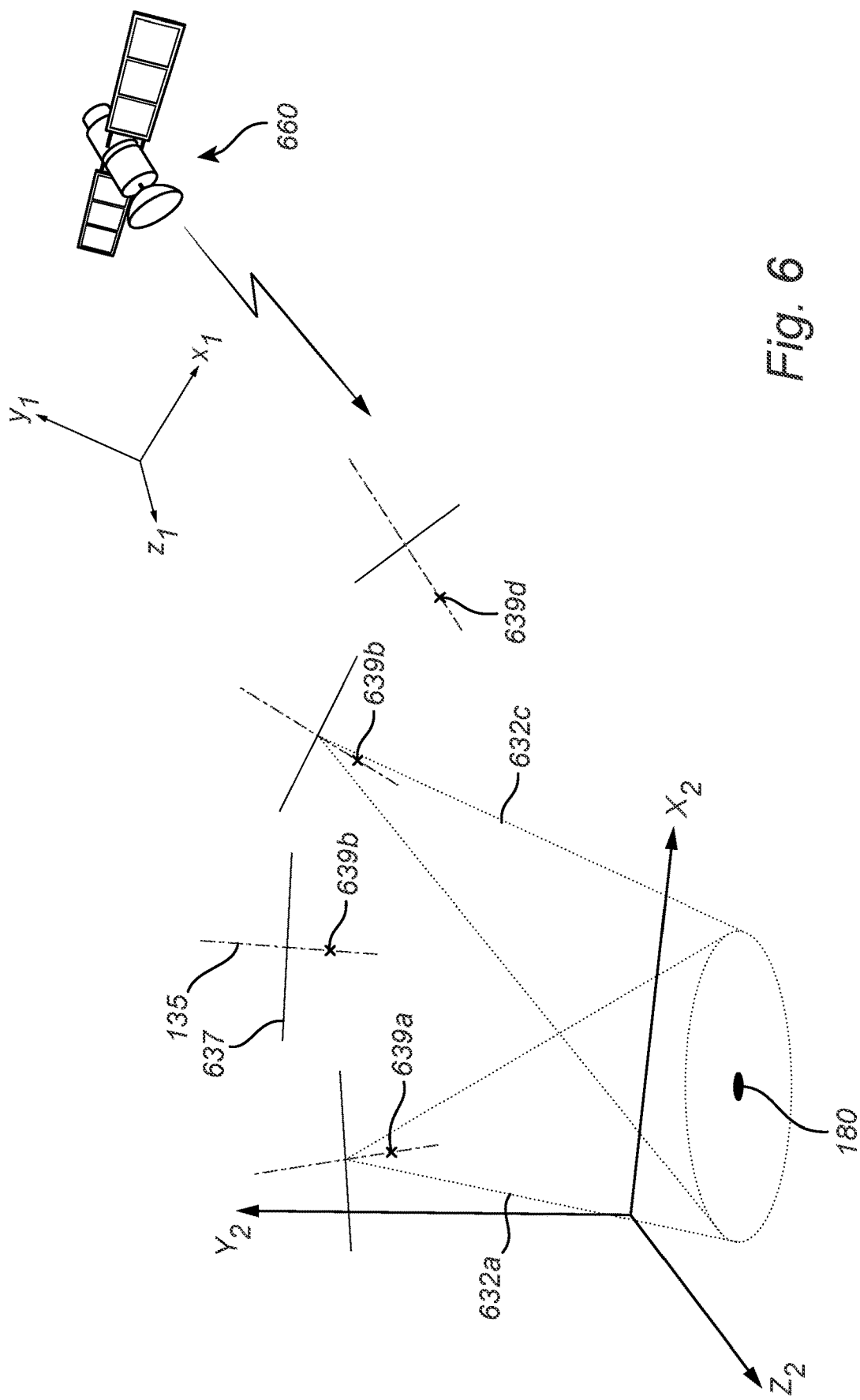
FIG. 6 illustrates at least part of a workflow, or scenario, for determining the distance from the antenna of the positioning device to the point of interest.

FIG. 6 illustrates an embodiment of at least part of a workflow of a method for determining the distance of the positioning device to the point of interest 180. FIG. 6 shows a scenario in which the positioning device 100 is placed at four different positions for capturing four different images of a scene including the point of interest denoted 180. For illustration purposes, only a part of the positioning device 100 is represented in FIG. 6. In particular, the positioning device is represented by a plane 637 which may correspond to the image chip (or image sensor) in the imaging device 130 of the positioning device 100.

In the embodiment shown in FIG. 6, the processing unit 150 of the positioning device 100 may cause the capture of four overlapping images of the scene at which the point of interest 180 is located, as represented by the overlapping zones 632a and 632c of the field of view of the imaging sensor 637. For this purpose, an operator may move at different places and capture a series of images, such as four in the present example, of the scene. The four different locations at which the four images of the scene are captured may correspond to the positions 639a, 639b, 639c and 639d of the projection center of the imaging device 130 (the lens being not shown in FIG. 6). It will be appreciated that another point of the imaging device may be taken as a reference, such as for example the center of the imaging sensor 637, for the position of the imaging device.

The positioning device 100, or rather its processing unit 150, may define an arbitrary local coordinate system ($X_2$, $Y_2$, $Z_2$). As illustrated in FIG. 6, the arbitrary coordinate system does not need to be centered at one of the positions 639a, 639b, 639c or 639d of the imaging device 130 from which the images are captured. It will be appreciated that the positions 639a, 639b, 639c and 639d are arbitrary selected by the operator of the positioning device 100 when capturing the images, or a video, of the scene and the positions of the imaging device in the arbitrary coordinate system ($X_2$, $Y_2$, $Z_2$) for the four different images are thus, as such, not known at the beginning of the method performed by the processing unit 150.

FIG. 6 shows also only one satellite 660 from which GNSS signals may be sent to an GNSS antenna (not shown in FIG. 6) of the positioning device 100. As mentioned above, the GNSS antenna may receive signals from four or more satellites and the signals may be computed, either by the processing unit 150 of the positioning device 100 itself, or a processing unit of server in communication with the positioning device, to determine the position of the phase center of the antenna 110 of the positioning device 100 in an absolute coordinate system ($X_1$, $Y_1$, $Z_1$) relating to the GNSS.

Figure 7:
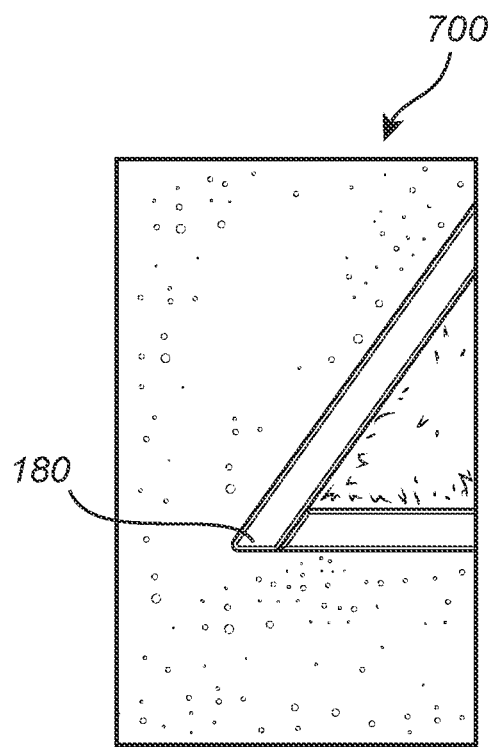
FIG. 7 shows an example of a two-dimensional image captured by a portable positioning device in accordance with an embodiment.

An example of a two-dimensional image 700 of a path border which may be captured by the imaging device 130 is shown in FIG. 7 for illustration purposes. The corner of the path border may be the point of interest 180 in the present example. The procedure may be repeated a number of times such that a plurality, or a series, of images of the path border and its surrounding is captured.

Figure 5:
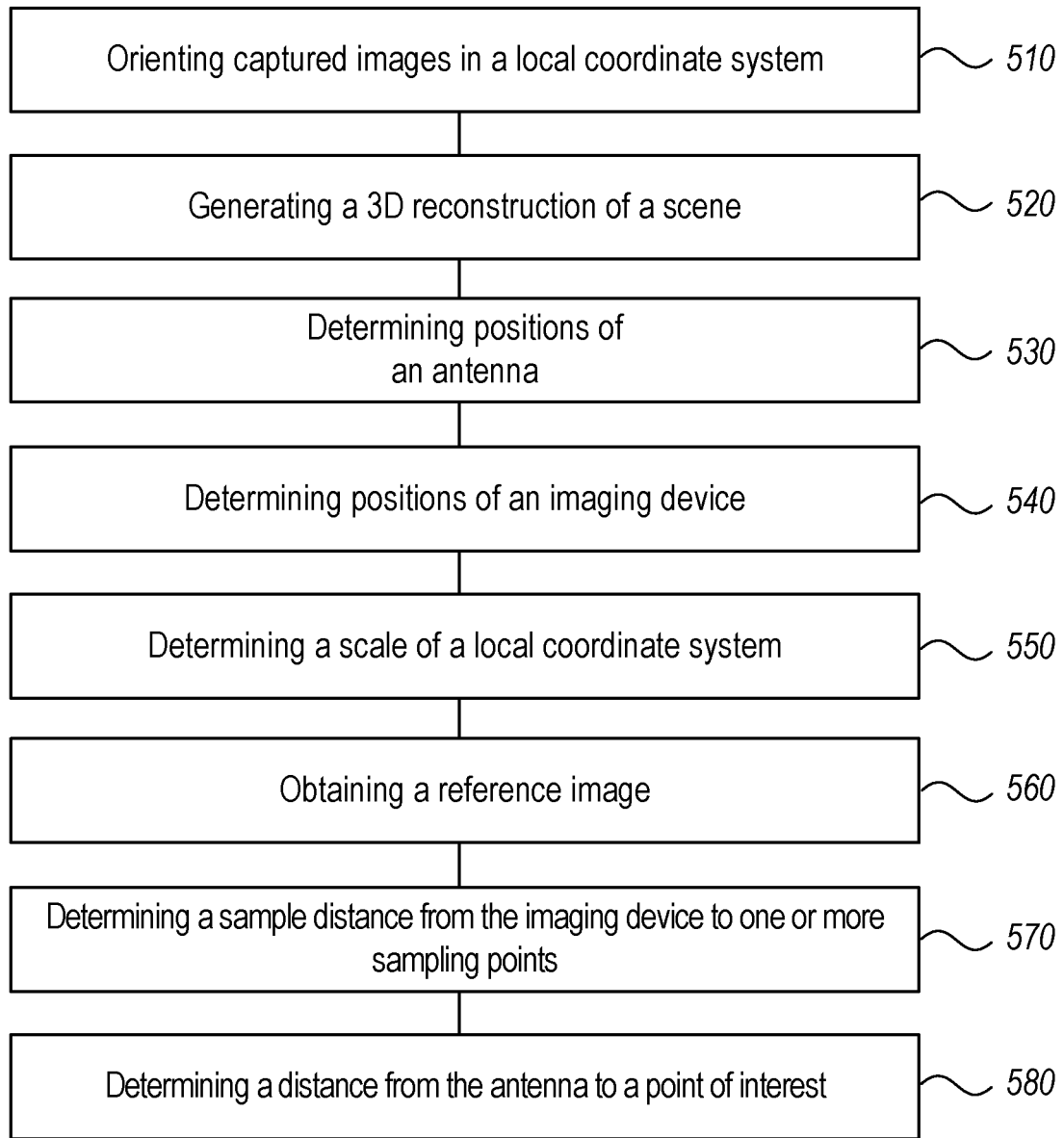
FIG. 5 shows an embodiment of a procedure for determining the distance from the portable positioning device to the point of interest via an imaging device of the portable positioning device.

Referring to FIG. 5, at 510, the captured images (four in the example shown in FIG. 6) may then be orientated in a local coordinate system ($X_2$, $Y_2$, $Z_2$) with respect to each other. The local coordinate system ($X_2$, $Y_2$, $Z_2$) is fixed with respect to the absolute coordinate system ($X_1$, $Y_1$, $Z_1$) of the GNSS and may be arbitrarily defined by the processing unit. A three-dimensional (3D) reconstruction of the scene may then be generated, at 520, using the orientated series of captured images. Different techniques may be employed for orientating the images of the scene captured by the imaging device in a local coordinate system.

For example, the captured images may be orientated by identifying common characteristic features among the captured images and/or by using a so-called structure from motion (SFM) technique or any other photogrammetric technique enabling the orientation of the images with respect to each other based on the content of the captured images themselves. For this purpose, the images to be orientated with respect to each other may overlap.

According to another example, if the levelling detector 120 is an IMU, the captured images may be orientated based on acceleration and gyroscopic data received from an IMU 120 of the positioning device 100. In other words, in this embodiment, the images may be orientated based on data representative of the motion of the imaging device between the capture of different images instead of being based on the content of the images themselves.

Further, the observations of the IMU 120 when capturing the series of images may be used in combination with photogrammetric techniques for orientating the images in order to improve the orientation of the images.

Figure 8:
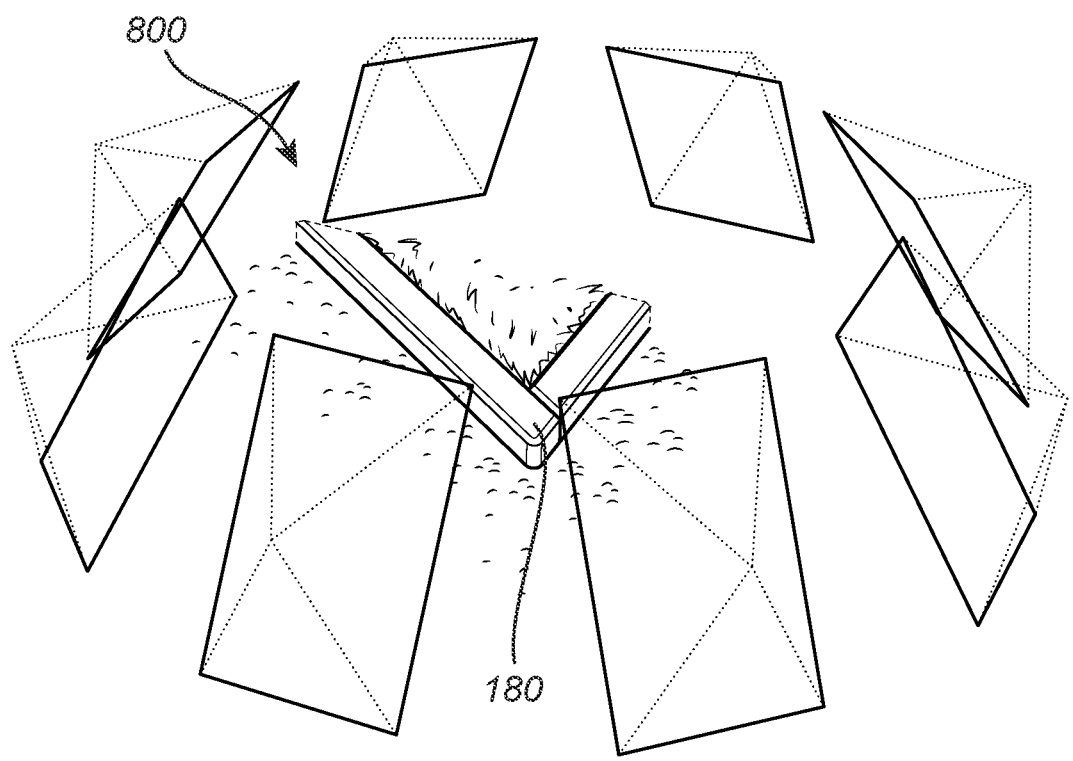
FIG. 8 shows an example of a 3D reconstruction generated by a portable positioning device in accordance with an embodiment.

The positioning device 100, or rather its processing unit 150, may then be adapted, at 530, to generate a 3D reconstruction of the scene based on the orientated series of images. FIG. 8 shows an example of the scene captured by images such as the image shown in FIG. 6, i.e. FIG. 8 shows a 3D reconstruction of the path border 800 with its corner 180. The 3D reconstruction may for example be displayed at the display unit 140 of the positioning device 100.

Turning again to FIG. 5, at 530, positions of the antenna 110 in the coordinate system of the GNSS for at least a subset of the captured images may be determined based on satellite information signals received at the GNSS antenna 120 while capturing the images. In the present example, the 3D positions of the antenna 110 in the coordinate system of the GNSS may be determined for at least two images captured with the imaging device 130 placed at two different positions being horizontally displaced. Accordingly, a first list with the 3D positions of the antenna in the coordinate system used by the GNSS for some of the captured images (the subset) is obtained.

Further, the processing unit 150 may, at 540, determine the positions of the imaging device in the local coordinate system $(X_2, Y_2, Z_2)$ for at least some of the captured images, in particular for at least two images for which the positions of the antenna in the coordinate system $(X_1, Y_1, Z_1)$ of the GNSS have been determined.

The positions of the imaging device 130 in the local coordinate system $(X_2, Y_2, Z_2)$ are obtained based on the orientation of the images in the local coordinate system $(X_2, Y_2, Z_2)$ and are therefore obtained similarly, i.e. using photogrammetry and/or based on acceleration and/or gyroscopic data received from the IMU 170 of the positioning device 100.

As a result, a second list with the 3D positions of the imaging device in the local coordinate system for at least some images of the subset is obtained.

The processing unit may then, at 550, determine a scale of the local coordinate system $(X_2, Y_2, Z_2)$ based on a known spatial position of the imaging device 130 relative to the GNSS antenna 110 within the positioning device 100 for the captured images (the antenna offset), the determined 3D positions of the antenna 110 in the coordinate system of the GNSS and the corresponding positions of the imaging device 130 in the local coordinate system $(X_2, Y_2, Z_2)$ for the images of the subset.

In other words, the first list of 3D positions of the antenna in the GNSS, the second list of 3D positions of the imaging device in the local coordinate system for at least some images of the subset, and the known spatial position of the antenna relative to the imaging device within the portable positioning device when capturing each one of the images are used by the processing unit to establish the scale of the local coordinate system.

The processing unit may then obtain, at 560, a reference image captured once the antenna 110 is horizontally levelled and positioned over the point of interest 180.

Figure 9:
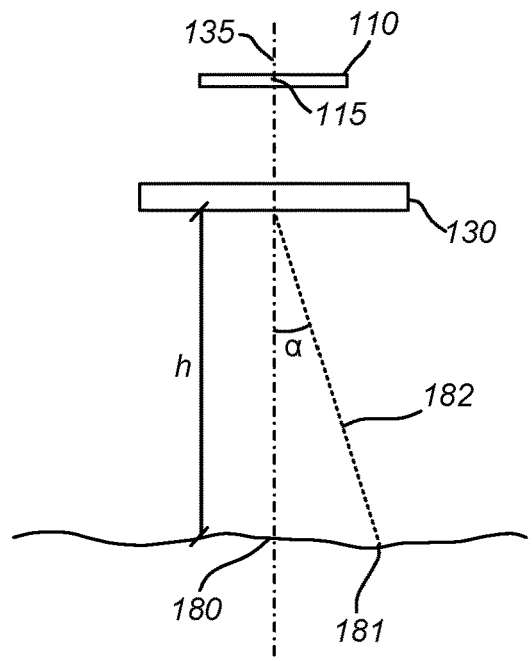
FIG. 9 illustrates how the distance/height of an imaging device to a point of interest can be determined, in accordance with an embodiment.
Figure 10:
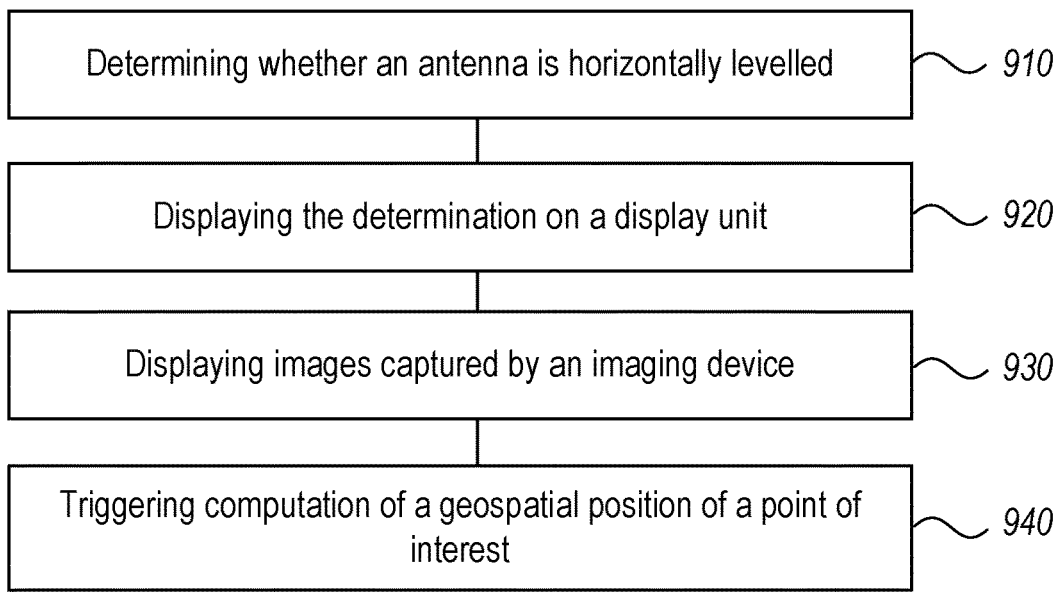
FIG. 10 shows a flow chart illustrating a general overview of a method for determining the geospatial position of a point of interest in accordance with some embodiments.

With reference to FIGS. 5 and 9, the final part of the procedure for determining the distance from the antenna 110 to the point of interest 180 is described.

FIG. 9 shows part of the positioning device with its GNSS antenna being horizontally levelled and the phase center 115 of the antenna 110 being arranged vertically over the point of interest 180. In this configuration, the optical axis 135 of the imaging device 130 is vertical and the point of interest 180 and the phase center 115 of the antenna 110 are aligned along the optical axis 135. At 570, a sampling distance 182 from the imaging device to one or more sampling points 181 or a sampling area of the 3D reconstruction located in the vicinity of the point of interest 180 is determined. It will be appreciated that the sampling distance 182 may be determined with respect to the nearest neighbor of the point of interest 180 in the local coordinate system or with respect to a surface formed by one or more sampling points of the 3D reconstruction that are located in the vicinity of the point of interest 180.

At 580, the processing unit may determine the distance (or height) from the antenna to the point of interest based on the determined sampling distance 182, the antenna offset, the determined scale of the local coordinate system and the angle α defined between the optical axis 135 and a direction 182 to the sampling point 181 or a direction representative of the sampling area formed by one or more sampling points.

As already mentioned, in some embodiments, the series of captured images may be a captured video of the scene including the point of interest.

Further, the display unit may be configured to display a two-dimensional image 400 of the series of images, the 3D reconstruction of the scene, the 3D position of the point of interest determined by the processing unit and/or an indication as to whether the GNSS receiving unit is activated. As another example, or in addition, the scale of the 3D representation may be established based on data obtained from an inertial measurement unit, for example used as the levelling detector 120 to determine whether the antenna is horizontally levelled.

Referring to the workflow described above, the images or video used to obtain a 3D reconstruction of the scene may be obtained while approaching the point of interest. The processing unit may then cause the reference image to be captured once the antenna is horizontally levelled and the phase center of the antenna is vertically aligned with the point of interest. While it is herein described that the images used to obtain the 3D reconstruction of the scene are captured before the reference image is captured, it will be appreciated that the images used to obtain the 3D reconstruction may be captured after the reference image is captured.

A general overview of a method 900 implemented in a positioning device 100 is provided with reference to FIG. 9. The positioning device may comprise an antenna adapted to receive satellite information signals from a global navigation satellite system, the antenna having a phase center, a levelling detector arranged relative to the antenna for detecting whether the antenna is positioned horizontally, a display unit and an imaging device having a sighting axis, wherein the phase center of the antenna is arranged along, or at least close to, the sighting axis. The positioning device may be a positioning device as defined in any one of the preceding embodiments.

The method may comprise determining, at 910, whether the antenna is horizontally levelled based on an input from the levelling detector. Further, the method may include, at 920, displaying the determination on the display unit for assisting a user in identifying whether the antenna is horizontally levelled and, at 930, displaying on the display unit images captured by the imaging device for assisting a user in identifying a point of interest within a field of view of the imaging device and in identifying whether the phase center of the antenna is positioned vertically, or at least close to vertically, above the point of interest. At 940, the method may include triggering computation of the geospatial position of the point of interest based on the satellite information signals received at the antenna for the position for which an indication that the antenna is horizontally levelled and its phase center is positioned vertically, or at least close to vertically, over the point of interest is received. The computation of the point of interest may be triggered by a user input.

It will be appreciated that all embodiments described above with respect to the different positioning devices apply to the above described embodiment of the method.

Figure 11:
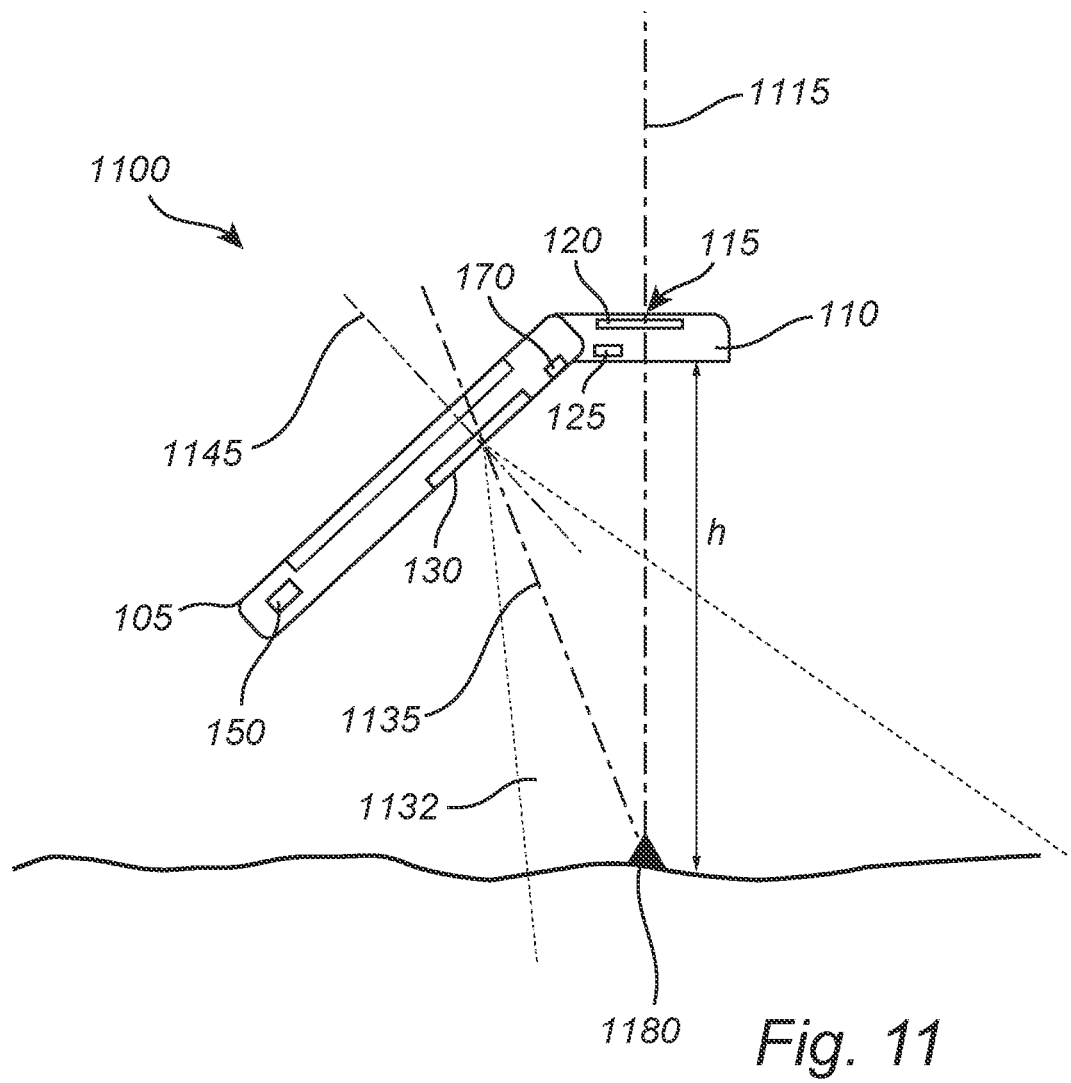
FIG. 11 illustrates an embodiment of a positioning device in which the imaging device is arranged in an inclined position with respect to the GNSS antenna.

Referring to FIG. 11, a positioning device 1100 according to another embodiment is described.

The positioning device 1100 is equivalent to the positioning device 100 described with reference to FIG. 1 except that the imaging device 1130 is arranged differently with respect to the GNSS antenna 120. The positioning device 1100 includes the GNSS antenna 120, a levelling detector 125, a display unit 140, a processor 150, a distance determining module 170 and the imaging device 1130.

FIG. 11 illustrates a configuration in which the imaging device is inclined with respect to the plane in which the antenna 120 extends.

The present embodiment illustrates also that the imaging device 1130 has an optical axis 1145, which corresponds to the axis of rotational symmetry of the imaging device, such as the axis passing through the center of a lens of the imaging device or through the center of an image sensor (or a focal point or projection center) of the imaging device.

FIG. 11 illustrates also that the imaging device may have a sighting axis 1135, which is different from the optical axis 1145 of the imaging device 1130. The sighting axis 1135 is the axis passing through a fiducial maker and the projection center of the optical system of the imaging device, as represented by the center of an optical lens of the imaging device or by the intersection between the optical axis 1145 and the sighting axis 1135. It will be appreciated that, for a fixed sighting axis 1135, the position of the intersection of the sighting axis 1135 with the ground surface depends on the height at which the positioning device 1100 is held. FIG. 11, however, shows a situation in which the sighting axis 1135 intersects the point of interest 1180. In this configuration, the placement of the fiducial marker is therefore adjusted as a function of the distance (the height) of the positioning device over the point of interest to perform a particular measurement. In other words, the height of the positioning device 1100 above the ground surface is used in the procedure for positioning the phase center above the point of interest 1180.

The distance from the positioning device to the (ground) surface may be measured, or estimated, by the distance measuring module 170, or may be input by a user of the positioning device 1100. Alternatively, the height may be determined based on a procedure based on the use of the imaging device, such as the procedure described with reference to FIG. 5.

FIG. 11 illustrates also that the GNSS antenna 120 may have an antenna axis 1115, which is the axis perpendicular to the plane in which the antenna 120 extends and passing through the phase center 115. Although the angles are exaggerated in FIG. 11 for the purpose of illustration, it may be beneficial, in some embodiments, if the angle formed between the sighting axis 1135 and the antenna axis 1115 is lower than five degrees.

Except for the above mentioned difference, all other features of the embodiments of the positioning devices and methods described with reference to FIGS. 1-10 apply also to the present embodiment.

Further, still referring to FIG. 11, a procedure for calibration of the imaging device, or rather its associated optical system, will be described.

As mentioned above, the portable positioning device may further comprise at least one fiducial marker in the field of view of the imaging device for assisting in sighting the point of interest. The fiducial marker may be in the form of, for example, a cross or a dot visible on the display unit. The fiducial marker is provided for assisting the operator in sighting the point of interest. A fiducial marker defines, together with the optic system of the imaging device, a sighting axis of the imaging device.

Referring to FIG. 11, it is shown a sighting axis 1135, as defined by a fiducial marker (not shown) of the imaging device, and an antenna axis 1115.

As can be seen, when the positioning device is positioned at a certain height "h" above the ground surface, the sighting axis 1135 and the antenna axis 1115 intersects at the point of interest 1180. However, should the positioning device be held at a higher position above the point of interest than what is shown in FIG. 11, the sighting axis 1135 would not intersect the ground surface at the point of interest 1180 but at a location on the right of the point of interest 1180 in the image shown in FIG. 11. Similarly, should the positioning device be held at a lower position above the point of interest than what is shown in FIG. 11, the sighting axis 1135 would not intersect the ground surface at the point of interest 1180 but at a location on the left of the point of interest 1180. This means that, if the positioning device is not held at the height "h", as shown in FIG. 11, but at another height, the sighting axis 1135 is not appropriate for sighting the point of interest 1180.

Thus, depending on the height h at which the positioning device is held above the point of interest, the sighting axis, and thereby the position of the fiducial marker associated with the imaging device 130, needs to be adjusted. For this purpose, the positioning device may be subject to a calibration procedure in which the position of the fiducial marker as a function of the height is determined. The position of the fiducial marker in the optical system assisting the operator in sighting the point of interest may be expressed by its coordinates $x_{cursor}$ and $y_{cursor}$.

A generic calibration may be performed in factory with a plurality of positioning devices, wherein rods of known lengths are placed vertically between the antenna and a marker placed on ground. The rod may be equipped with a pointing tip for placing the rod on the marker. The position ($x_{cursor}$, $y_{cursor}$) of the fiducial marker for a number of rod lengths may be determined such that the sighting axis intersects the marker on the ground. The dependence of the position of the fiducial marker as a function of the height may for example be expressed by the following linear regression model:

$$x_{cursor} = f_x(h) = a_x/h^2 + b_x; \text{ and}$$

$$y_{cursor} = f_y(h) = a_y/h^2 + b_y$$

wherein $a_x$, $a_y$, $b_x$, and $b_y$ are constants defining the linear regression. The element $x_{cursor}$ and $y_{cursor}$ may be expressed in terms of pixels (as unit) while h may be expressed in, for example, meter (m). Accordingly, $b_x$, and $b_y$ are also expressed in pixels and $a_x$, $a_y$ are expressed in pixel/m². Another unit of length may of course be used.

As an example, the values of $a_x$, $a_y$, $b_x$, and $b_y$ may be determined during a calibration procedure in factory for a plurality of positioning devices from the same batch (i.e. with the same arrangement of devices within the positioning device) and a plurality of heights.

Depending on the height then entered by an operator and/or determined by the positioning device for performing a measurement, the position of the fiducial marker, and thereby the sighting axis, can be determined using the calibrated values of $a_x$, $a_y$, $b_x$, and $b_y$.

It is also beneficial if a calibration procedure is performed for each one of the positioning devices, either in factory or on measurement site, in order to tune the values of $a_x$, $a_y$, $b_x$, and $b_y$ for a specific positioning device. In other words, the values of $a_x$, $a_y$, $b_x$, and $b_y$ may be device-specific rather than being batch-specific. The calibration procedure may be more or less complex depending on the number of heights for which it is performed. Using only one height, the values of $b_x$, and $b_y$ may be adjusted for a specific device. With a plurality of heights, the values of all parameters $a_x$, $a_y$, $b_x$, and $b_y$ may be adjusted for a specific device.

It will be appreciated that a calibration procedure of the imaging device may also be performed for a positioning device in accordance with any one of the embodiments described above with reference to FIGS. 1-10, at least to compensate for errors (for example mechanical, optical and electronical) related to the elements of the positioning device even if the height is not necessary for computing a two-dimensional position of the point of interest. In this case, the calibration procedure is performed to align the sighting axis with the antenna axis. This is a particular case of the above mentioned calibration procedure in which the terms $a_x$ and $a_y$ are equal to zero.

Figure 12:
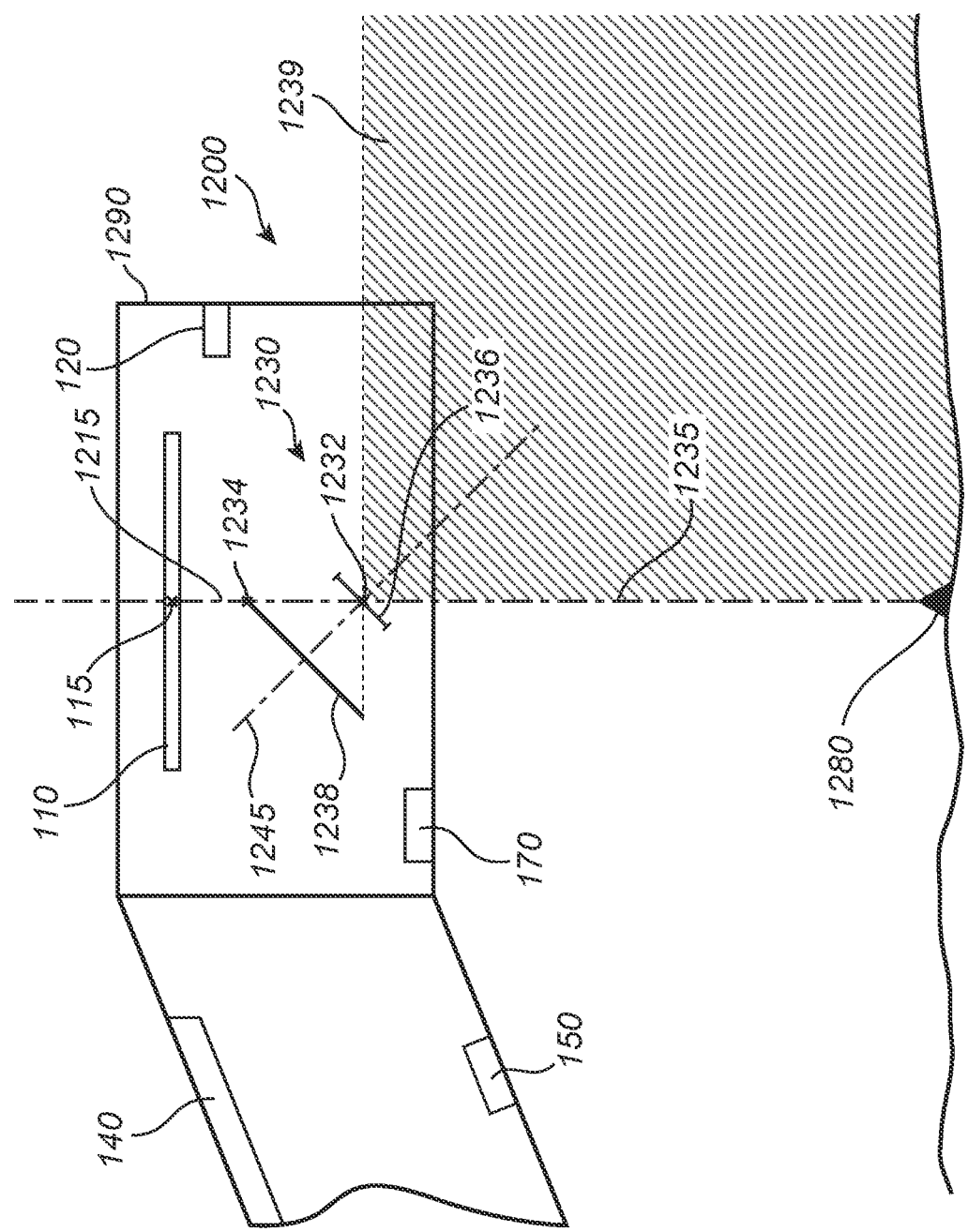
FIG. 12 illustrates another embodiment of a positioning device in which the imaging device is arranged in an inclined position with respect to the GNSS antenna.

Referring to FIG. 12, a positioning device 1200 according to another embodiment is described.

The positioning device 1200 is equivalent to the positioning device 100 described with reference to FIG. 1 except that the imaging device 1230 is arranged differently with respect to the GNSS antenna 110. The positioning device 1200 includes the GNSS antenna 110, a levelling detector 120, a display unit 140, a processor 150, a distance determining module 170 and the imaging device 1230.

FIG. 12 illustrates a configuration in which the imaging device 1230 is inclined with respect to the plane in which the antenna 110 extends. The antenna 110 has a phase center 115 and an antenna axis 1215 which is the vertical axis passing through the phase center 115.

The present embodiment illustrates also that the imaging device 1230 has an optical lens 1236, an image sensor 1238 and an optical axis 1245. The image sensor 1238 is inclined with respect to the antenna axis 1215. The optical axis 1245 corresponds to the axis of rotational symmetry of the imaging device, as defined by the axis passing through the center of the lens 1236 of the imaging device. In the configuration shown in FIG. 12, the optical axis passes also through the center of the image sensor 1238 of the imaging device 1230. The imaging device 1230 includes a projection center 1232 defining the field of view of the imaging device 1230.

Figure 13:
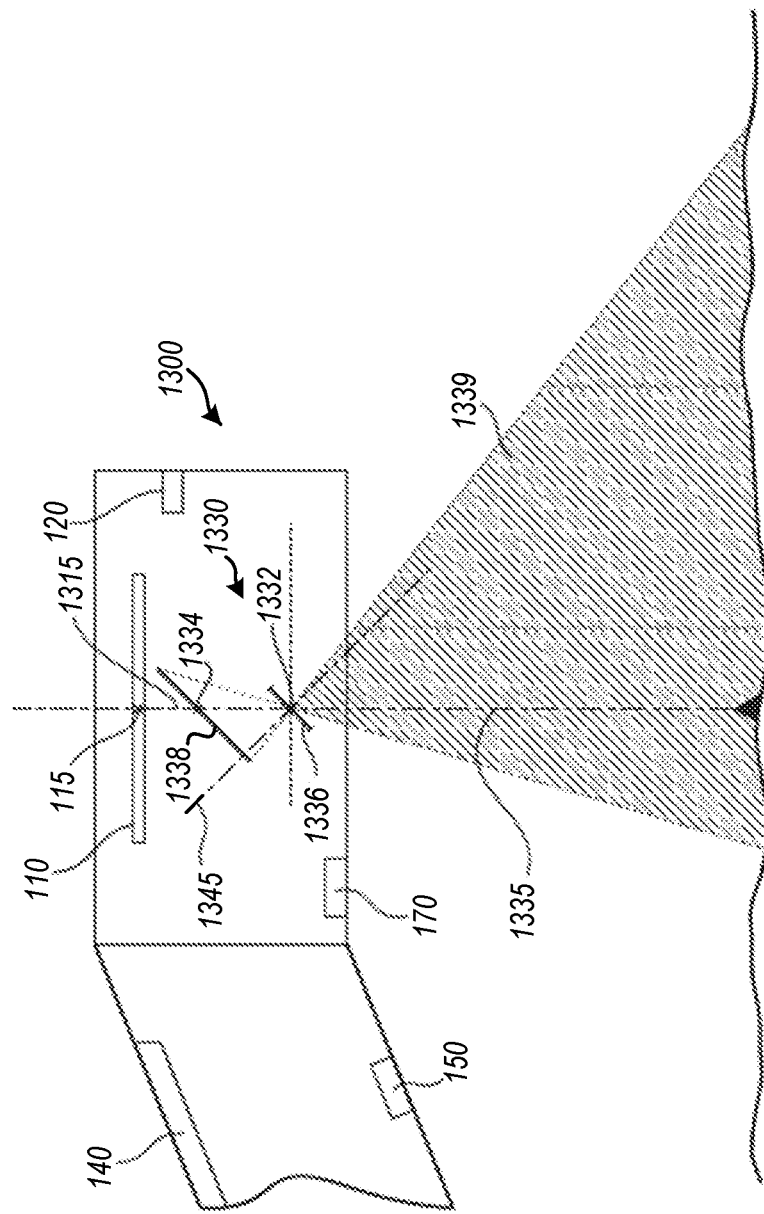
FIG. 13 illustrates yet another embodiment of a positioning device in which the imaging device is arranged in an inclined position with respect to the GNSS antenna.

FIG. 12 illustrates also that the imaging device 1230 has a sighting axis 1235, which is different from the optical axis 1245 of the imaging device 1230. In particular, the optical axis 1245 intersects both the antenna axis 1215 of the GNSS antenna and the sighting axis 1235. The sighting axis 1235 is the axis passing through a fiducial maker 1234 and the projection center 1232 of the optical system of the imaging device (as defined by the optical lens 1236), as represented by the intersection between the optical axis 1245 and the sighting axis 1235. In the present embodiment, the fiducial marker 1234 is, for exemplifying purposes, located at an extremity of the image sensor 1238. Accordingly, the point of interest 1280 is detected at a periphery of the field of view 1239 provided by the imaging device 1230. However, as will be described with reference to FIG. 13, the image sensor may be arranged differently within the imaging device 1230, and in particular may be displaced, such that the fiducial marker is not located at an extremity of the image sensor. As an alternative to displacing the image sensor relative to the lens 1236, such as shown in FIG. 13, the image sensor 1238 together with the lens 1236 may be rotated relative to the projection center 1232 such that the angle formed by the optical axis 1235 and the sighting axis 1235 is reduced as compared to what is shown in FIG. 12. In this latter configuration, the fiducial marker would not be placed at an extremity of the image sensor.

FIG. 12 shows a situation in which the sighting axis 1235 intersects the point of interest 1280, i.e. at a position at which the phase center 115 of the GNSS antenna 110 is vertically above the point of interest 1280.

In this configuration, the sighting axis 1215 and the sighting axis 1235 coincide such that the fiducial marker 1234, the projection center 1232 and the phase center 115 are arranged along the antenna axis 1215. In this configuration, the position of the fiducial marker in the field of view of the imaging device 1230 is not dependent on the distance (the height) of the positioning device over the point of interest to perform a particular measurement. When the positioning device is held with the sighting axis passing through the point of interest, as determined by means of the fiducial marker, the phase center of the antenna is located vertically above the point of interest and a two-dimensional geospatial position of the point of interest can be determined based on the received satellite information signals.

Still, the distance from the positioning device to the (ground) surface may be measured, or estimated, by the distance measuring module 170, or may be input by a user of the positioning device 1200, in order to obtain a 3D geospatial position of the point of interest. Alternatively, the height may be determined based on a procedure based on the use of the imaging device, such as the procedure described with reference to FIG. 5.

The GNSS antenna 110, the levelling detector 120, the image sensor 1230 and the distance determining module 170 may be part of a first module 1290 connected to another portion or module of the positioning device 1200 including the display unit 140 and the processor 150.

Except for the above mentioned differences, all other features of the embodiments of the positioning devices and methods described with reference to FIGS. 1-11 apply also to the present embodiment.

With reference to FIG. 13, another embodiment of a positioning device 1300 is described in which the imaging device 1330, and in particular its image sensor 1338, is inclined with respect to the plane in which the GNSS antenna 110 extends. In particular, the optical axis 1345 of the imaging device 1330 is arranged to intersect the sighting axis 1335 and the antenna axis 1315.

The positioning device 1300 shown in FIG. 13 is equivalent to the positioning device 1200 described with reference to FIG. 12 except that the position of the image sensor 1338 within the imaging device 1330, and in particular relative to the projection center 1332 of the imaging device 1330, has been moved. More specifically, as compared to the configuration shown in FIG. 12, the image sensor 1338 has been translated along a direction parallel to the lens 1336. In the present configuration, the optical axis 1345 does not pass through the center of the image sensor 1338. Still, the optical axis 1345 is defined as the axis passing through the projection center 1332 and through the center of the optical lens 1336. The optical axis 1345 is also perpendicular to the image sensor 1338. In the present configuration, the fiducial marker 1334 is arranged on the image sensor 1338 but not at an extremity of the image sensor 1338. In the present configuration, the sighting axis 1335 and the antenna axis 1315 coincide such that the fiducial marker 1334, the projection center 1332 and the phase center 115 of the GNSS antenna are located on the antenna axis 1315. FIG. 13 also shows the field of view 1339 provided by the imaging device 1330.

Except for the above mentioned difference, all other features of the embodiments of the positioning devices and methods described with reference to FIGS. 1-12 apply also to the present embodiment.

It will be appreciated that the embodiments described with reference to FIGS. 11-13 are beneficial in that the imaging device is inclined with respect to the antenna axis, thereby providing an improved field of view, looking forward instead of right under the positioning device (thereby not showing the operator's feet in the field of view).

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements. In the above, a processor or processing unit may include, by way of example, a general purpose processor, a special purpose processor, a conventional processor, a digital signal processor (DSP), a plurality of microprocessors, one or more microprocessors in association with a DSP core, and any other type of integrated circuit (IC).

Further, although applications of the positioning device have been described with reference to surveying systems, the invention may be used in other applications and/or systems.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method implemented in a positioning device comprising an antenna adapted to receive satellite information signals from a global navigation satellite system, a levelling detector arranged relative to said antenna for detecting whether said antenna is positioned horizontally, a display unit, and an imaging device having a sighting axis, which is an axis passing through a fiducial marker provided in a field of view of the imaging device for assisting in sighting a point of interest, wherein a position of the fiducial marker within said field of view is dependent on a distance at which the positioning device is held above the point of interest, wherein said antenna has a phase center and an antenna axis, which is a vertical axis passing through the phase center, and wherein the antenna axis intersects said sighting axis, said method comprising:
    determining whether said antenna is horizontally levelled based on an input from said levelling detector;
    displaying said determination on said display unit for assisting in identifying whether said antenna is horizontally levelled and displaying on said display unit images captured by said imaging device for assisting in identifying the point of interest within the field of view of said imaging device and in identifying whether said point of interest is along said sighting axis; and
    triggering computation of a geospatial position of the point of interest based on the satellite information signals received at the antenna for a position of the positioning device for which an indication is received that said antenna is horizontally levelled and that said point of interest is along said sighting axis.

2. The method of claim 1 wherein computation of the geospatial position of the point of interest is performed locally at the positioning device.

3. The method of claim 1 further comprising transmitting information based on the satellite information signals received by the antenna to a remote processing unit for computation of the geospatial position of the point of interest.

4. The method of claim 1 wherein computation of the geospatial position of the point of interest is triggered by user input.

5. The method of claim 1 further comprising identifying the point of interest based on user input.

6. The method of claim 1 wherein determining whether said antenna is horizontally levelled is based on user input.

7. The method of claim 1 wherein computation of the geospatial position of the point of interest is triggered by reception of the indication that said antenna is horizontally levelled and that said point of interest is along the sighting axis.

8. The method of claim 1 wherein the imaging device is a camera.

9. The method of claim 1 wherein the positioning device is a smartphone.

10. A method implemented in a positioning device comprising an antenna adapted to receive satellite information signals from a global navigation satellite system, a levelling detector arranged relative to said antenna for detecting whether said antenna is positioned horizontally, a display unit, and an imaging device having a sighting axis, wherein said antenna has a phase center arranged along said sighting axis, said method comprising:
    determining whether said antenna is horizontally levelled based on an input from said levelling detector;
    displaying said determination on said display unit for assisting in identifying whether said antenna is horizontally levelled and displaying on said display unit images captured by said imaging device for assisting in identifying a point of interest within a field of view of said imaging device and in identifying whether said phase center and said point of interest are vertically aligned; and
    triggering computation of a geospatial position of the point of interest based on the satellite information signals received at the antenna for a position of the positioning device for which an indication that said antenna is horizontally levelled and said phase center of said antenna is vertically aligned with said point of interest is received.

11. The method of claim 10 wherein computation of the geospatial position of the point of interest is performed locally at the positioning device.

12. The method of claim 10 further comprising transmitting information based on the satellite information signals received by the antenna to a remote processing unit for computation of the geospatial position of the point of interest.

13. The method of claim 10 wherein computation of the geospatial position of the point of interest is triggered by user input.

14. The method of claim 10 further comprising identifying the point of interest based on user input.

15. The method of claim 10 wherein determining whether said antenna is horizontally levelled is based on user input.

16. The method of claim 10 wherein computation of the geospatial position of the point of interest is triggered by reception of the indication that said antenna is horizontally levelled and that said point of interest is along the sighting axis.

17. The method of claim 10 wherein the imaging device is a camera.

18. The method of claim 10 wherein the positioning device is a smartphone.

* * * * *